United States Patent
Itoh

[19]
[11] Patent Number: 6,008,953
[45] Date of Patent: Dec. 28, 1999

[54] ZOOM LENS

[75] Inventor: Yoshinori Itoh, Yokohama, Japan

[73] Assignee: Canon Kabushiki Kaisha, Tokyo, Japan

[21] Appl. No.: 08/897,079

[22] Filed: Jul. 18, 1997

[30] Foreign Application Priority Data

Jul. 26, 1996 [JP] Japan .................................. 8-215367
Jun. 19, 1997 [JP] Japan .................................. 9-178922

[51] Int. Cl.$^6$ ............................ G02B 15/14; G02B 3/02; G02B 9/04
[52] U.S. Cl. ........................... 359/692; 359/717; 359/795
[58] Field of Search .................... 359/692, 717, 359/795

[56] References Cited

U.S. PATENT DOCUMENTS

| | | | |
|---|---|---|---|
| 5,218,478 | 6/1993 | Itoh | 359/692 |
| 5,274,504 | 12/1993 | Itoh | 359/676 |
| 5,305,148 | 4/1994 | Ikemori et al. | 359/689 |
| 5,353,163 | 10/1994 | Shibayama et al. | 359/692 |
| 5,365,376 | 11/1994 | Itoh | 359/686 |
| 5,574,599 | 11/1996 | Hoshi et al. | 359/689 |
| 5,585,971 | 12/1996 | Itoh | 359/692 |
| 5,587,840 | 12/1996 | Itoh | 359/686 |
| 5,633,760 | 5/1997 | Shibayama | 359/692 |
| 5,687,027 | 11/1997 | Itoh | 359/692 |
| 5,815,320 | 9/1998 | Hoshi et al. | 359/686 |
| 5,831,772 | 11/1998 | Nishio et al. | 359/689 |
| 5,844,725 | 12/1998 | Itoh | 359/692 |

FOREIGN PATENT DOCUMENTS

| | | |
|---|---|---|
| 57-201213 | 12/1982 | Japan . |
| 60-170816 | 9/1985 | Japan . |
| 60-191216 | 9/1985 | Japan . |
| 62-56917 | 3/1987 | Japan . |
| 62-284319 | 12/1987 | Japan . |
| 63-256915 | 10/1988 | Japan . |
| 64-52111 | 2/1989 | Japan . |
| 1-193807 | 8/1989 | Japan . |
| 2-50118 | 2/1990 | Japan . |
| 2-71220 | 3/1990 | Japan . |
| 2-190812 | 7/1990 | Japan . |
| 4-145408 | 5/1992 | Japan . |
| 8-240771 | 9/1996 | Japan . |

*Primary Examiner*—David Nelms
*Assistant Examiner*—Evelyn A. Lester
*Attorney, Agent, or Firm*—Fitzpatrick, Cella, Harper & Scinto

[57] ABSTRACT

A compact and lightweight zoom lens includes a first lens unit having a positive refractive power and a second lens unit having a negative refractive power, and performs zooming by changing the distance between the first and second lens units. The zoom lens satisfies required conditions related to the glass material, lens shape and optical power of the first and second lens units, and achieves a high zooming ratio ranging from 2.6 to 3 and high optical performance.

22 Claims, 14 Drawing Sheets

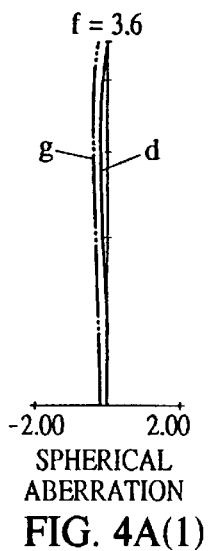
FIG. 4A(1) SPHERICAL ABERRATION
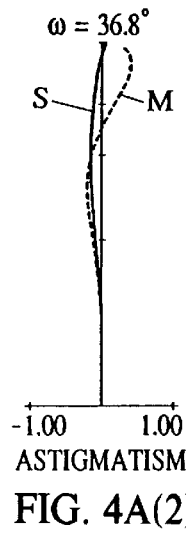
FIG. 4A(2) ASTIGMATISM
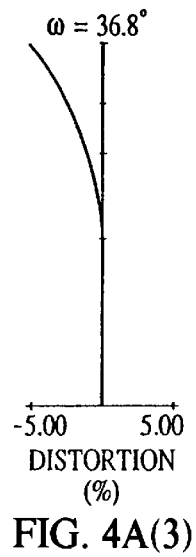
FIG. 4A(3) DISTORTION (%)
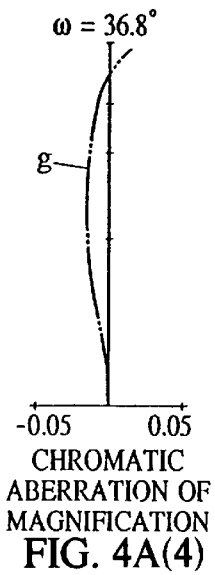
FIG. 4A(4) CHROMATIC ABERRATION OF MAGNIFICATION
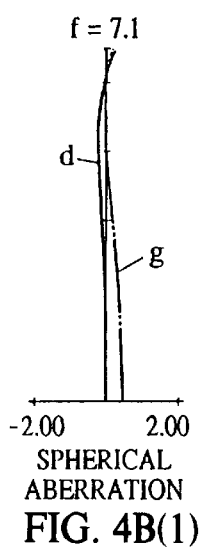
FIG. 4B(1) SPHERICAL ABERRATION
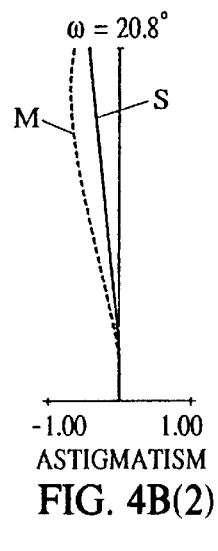
FIG. 4B(2) ASTIGMATISM
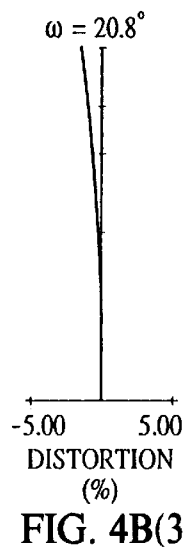
FIG. 4B(3) DISTORTION (%)
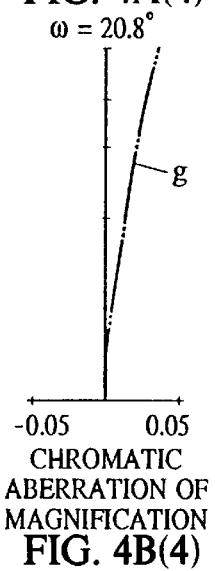
FIG. 4B(4) CHROMATIC ABERRATION OF MAGNIFICATION
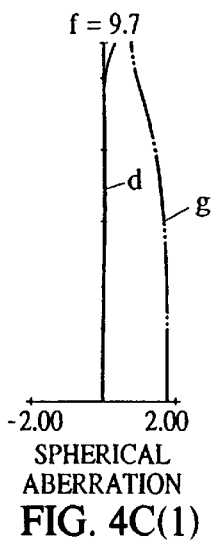
FIG. 4C(1) SPHERICAL ABERRATION
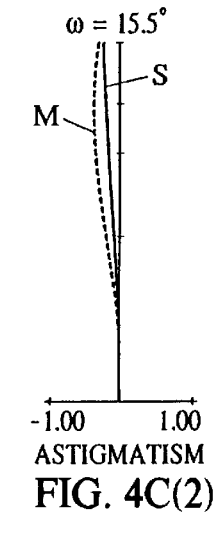
FIG. 4C(2) ASTIGMATISM
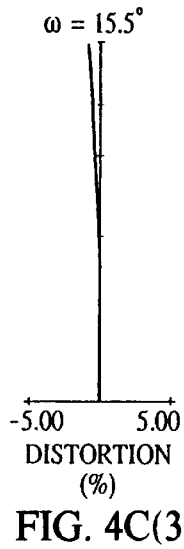
FIG. 4C(3) DISTORTION (%)
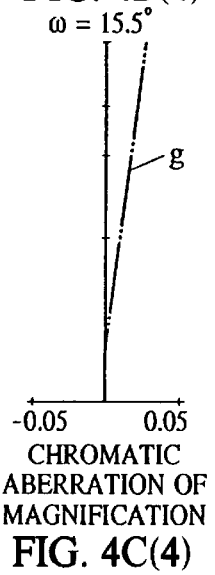
FIG. 4C(4) CHROMATIC ABERRATION OF MAGNIFICATION

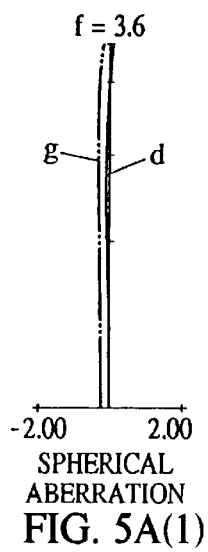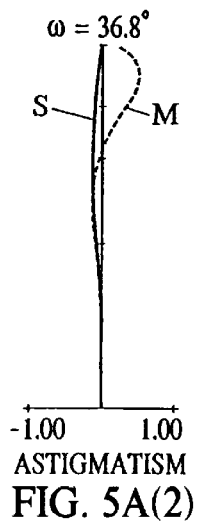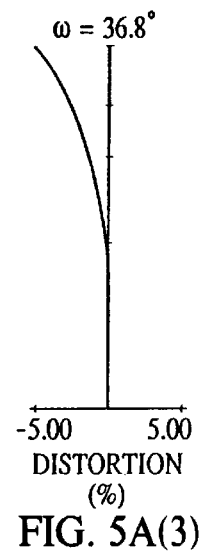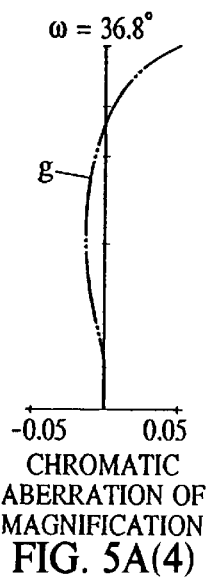
FIG. 5A(1) SPHERICAL ABERRATION
FIG. 5A(2) ASTIGMATISM
FIG. 5A(3) DISTORTION (%)
FIG. 5A(4) CHROMATIC ABERRATION OF MAGNIFICATION
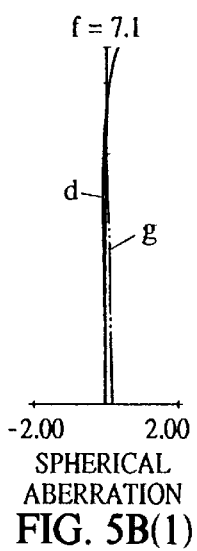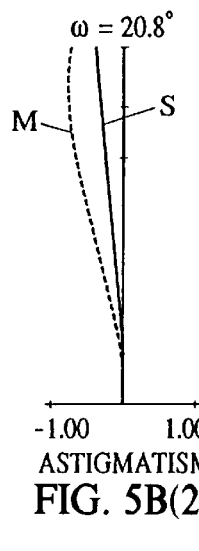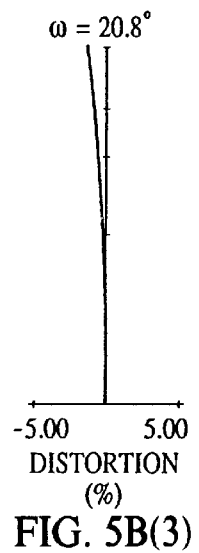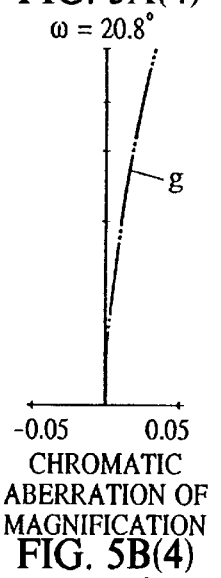
FIG. 5B(1) SPHERICAL ABERRATION
FIG. 5B(2) ASTIGMATISM
FIG. 5B(3) DISTORTION (%)
FIG. 5B(4) CHROMATIC ABERRATION OF MAGNIFICATION
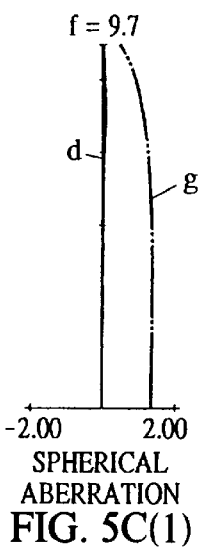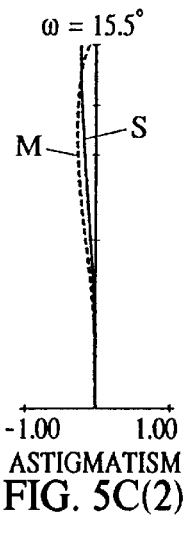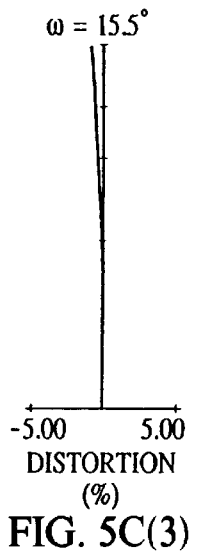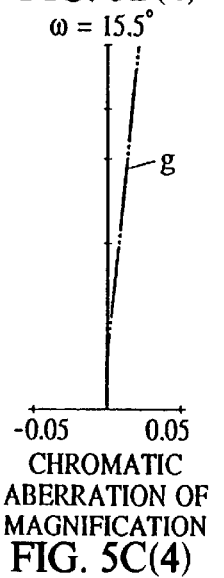
FIG. 5C(1) SPHERICAL ABERRATION
FIG. 5C(2) ASTIGMATISM
FIG. 5C(3) DISTORTION (%)
FIG. 5C(4) CHROMATIC ABERRATION OF MAGNIFICATION

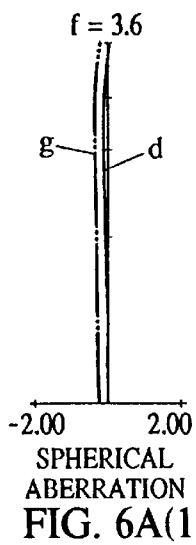
FIG. 6A(1) SPHERICAL ABERRATION
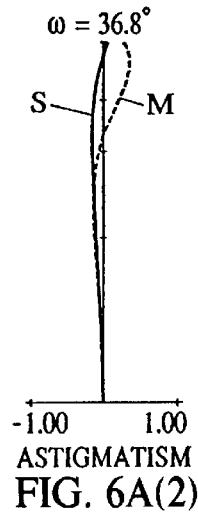
FIG. 6A(2) ASTIGMATISM
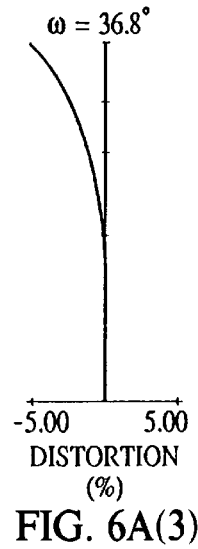
FIG. 6A(3) DISTORTION (%)
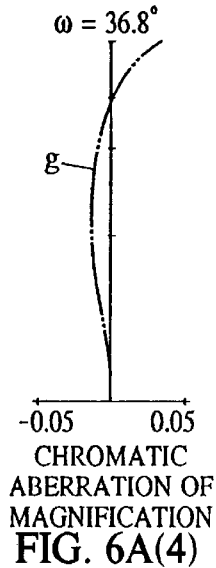
FIG. 6A(4) CHROMATIC ABERRATION OF MAGNIFICATION
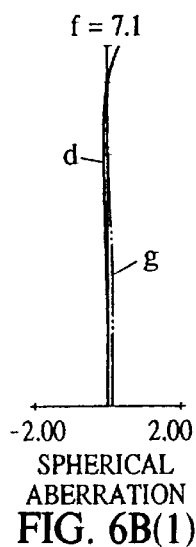
FIG. 6B(1) SPHERICAL ABERRATION
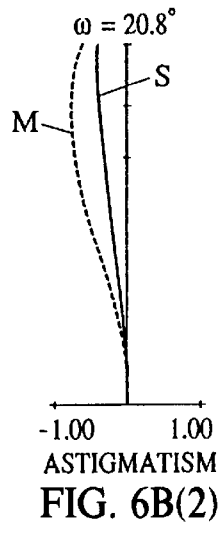
FIG. 6B(2) ASTIGMATISM
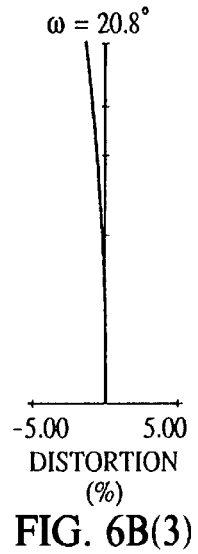
FIG. 6B(3) DISTORTION (%)
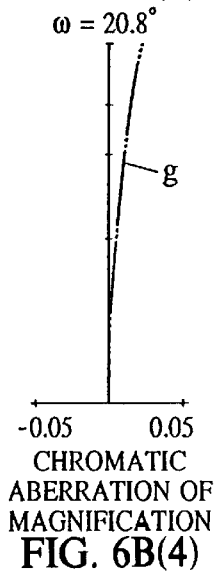
FIG. 6B(4) CHROMATIC ABERRATION OF MAGNIFICATION
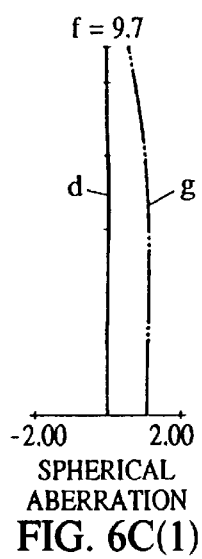
FIG. 6C(1) SPHERICAL ABERRATION
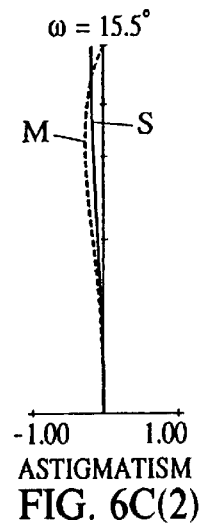
FIG. 6C(2) ASTIGMATISM
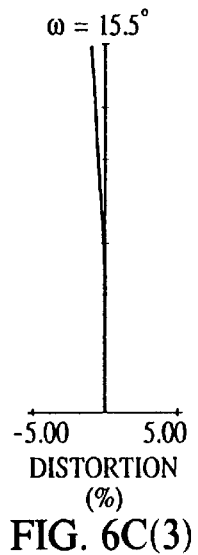
FIG. 6C(3) DISTORTION (%)
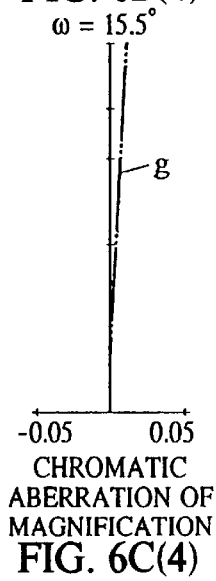
FIG. 6C(4) CHROMATIC ABERRATION OF MAGNIFICATION

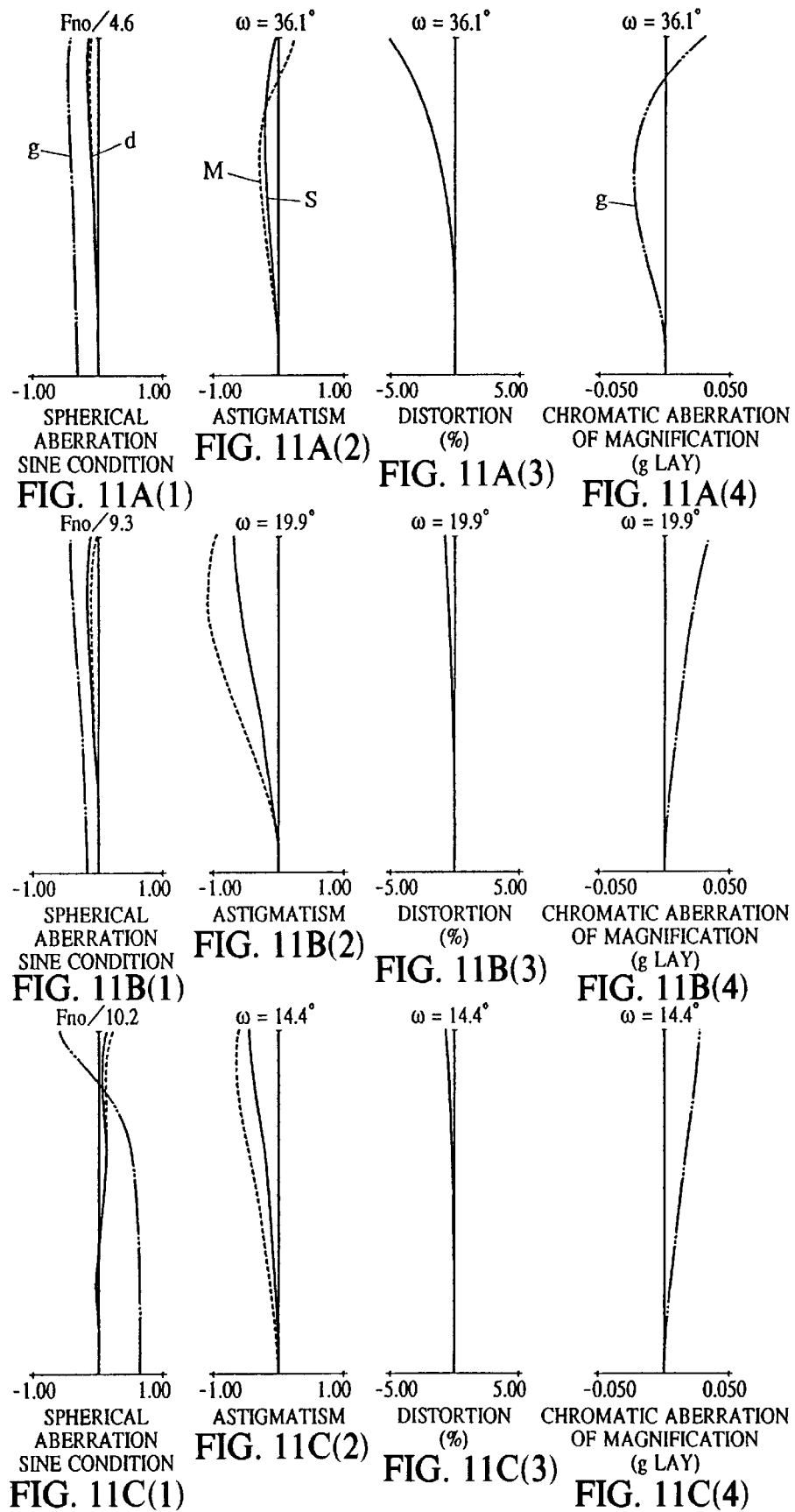

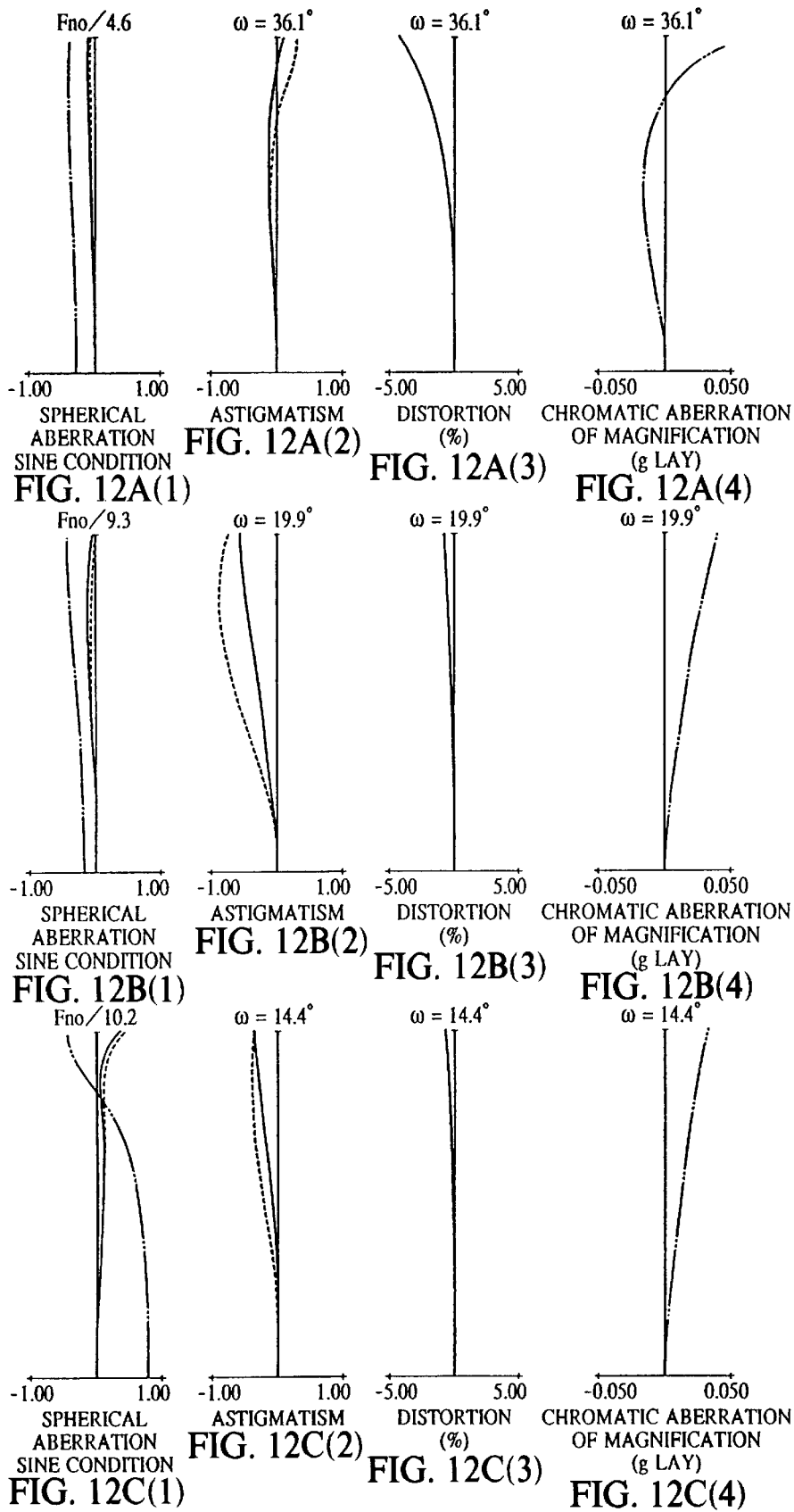

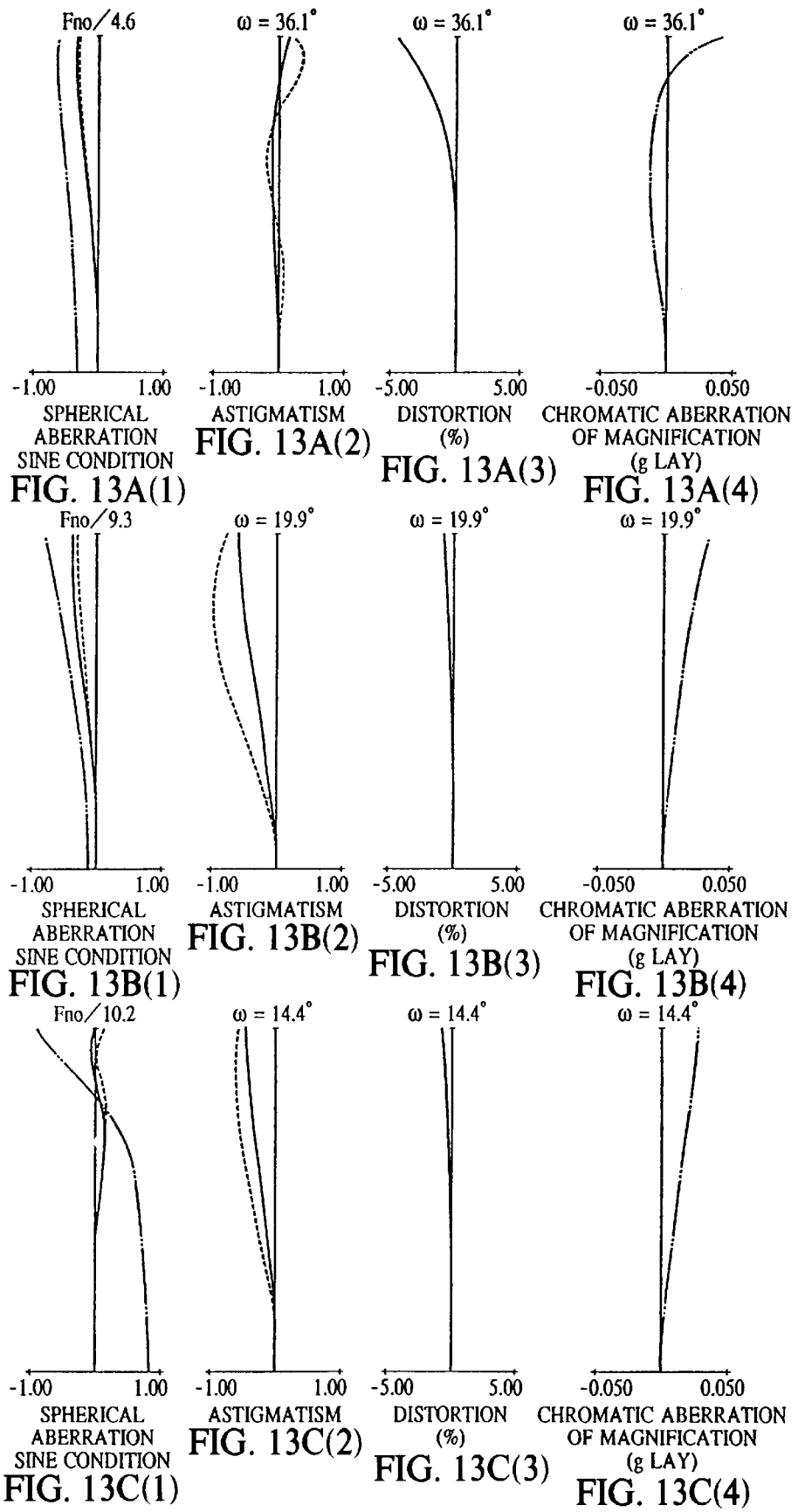

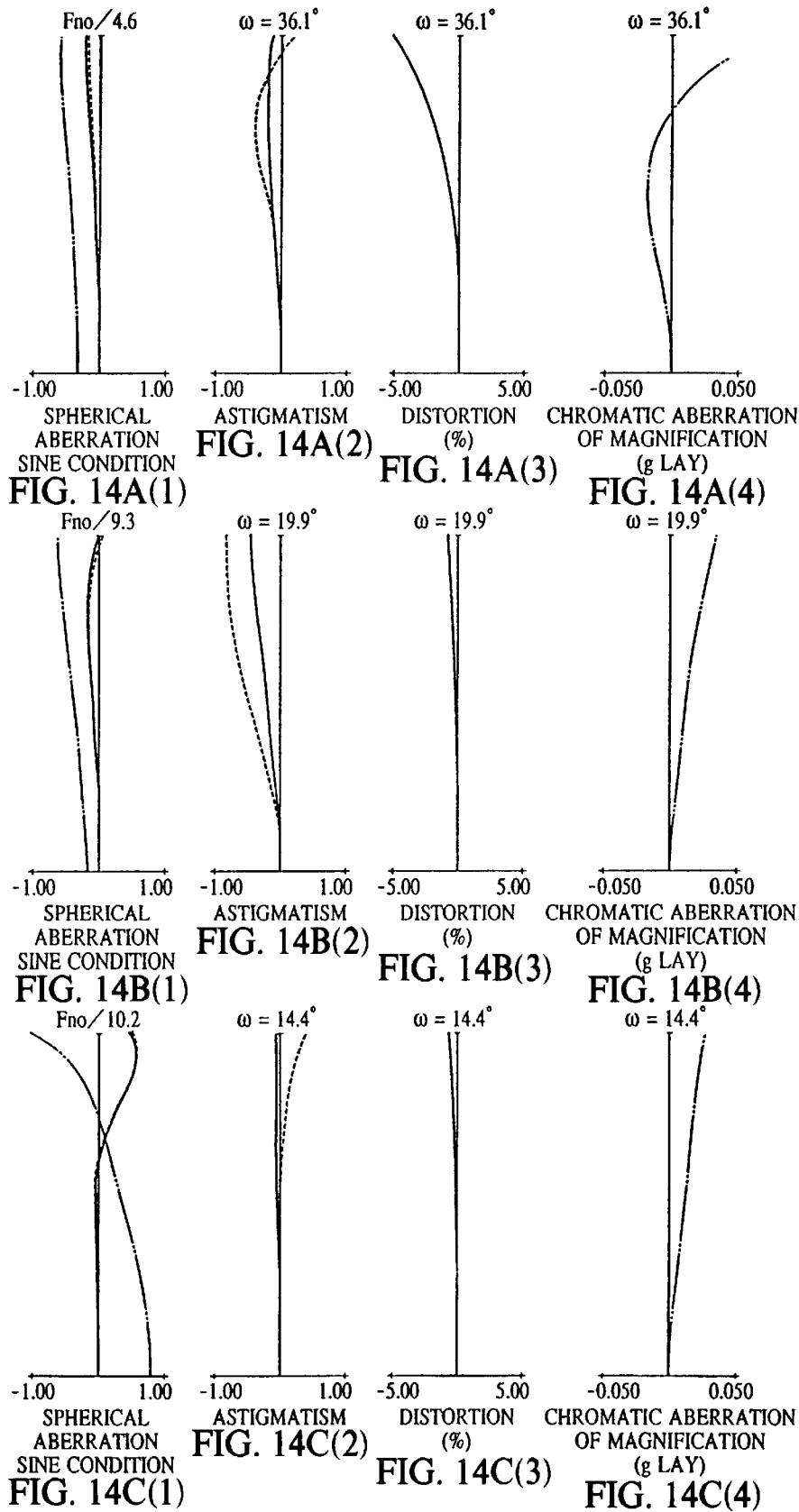

ZOOM LENS

BACKGROUND OF THE INVENTION

1. Field of the Invention

The present invention relates to a zoom lens consisting of two lens units which is best suited for a lens-shutter camera, a video camera and the like, and more particularly, to a zoom lens with a wide angle of view of about 74° at the wide-angle end and a zooming ratio of about 2.7, which excellently corrects the aberrations and shortens the total lens length (the distance between a first lens plane and an image plane) by appropriately setting the configuration of lenses in the lens units.

2. Description of the Related Art

Recently, the need for a compact zoom lens, whose total lens length is short, has increased with downsizing of a lens-shutter camera, a video camera and the like. In particular, it is requested that a zoom lens be attached to a compact camera such as a lens-shutter camera in which no lenses are interchanged, and there are strong demands for a compact zoom lens having almost the same length as a conventional fixed-focus camera.

In Japanese Patent Laid-Open Nos. 57-201213, 60-170816, 60-191216, 62-56917 and the like, the present applicant proposed a compact and so-called two-unit zoom lens which consists of a first lens unit having a positive refractive power and a second lens unit having a negative refractive power, positioned in the given order from the object side, and which performs zooming by changing the distance between the lens units.

The two-unit zoom lens having high optical performance disclosed in these patent applications arranges a positive refractive power and a negative refractive power in the given order from the object side, achieves a relatively short back focus, and shortens the total lens length.

Furthermore, Japanese Patent Laid-Open Nos. 62-284319, 63-256915, 64-52111, 1-193807 and the like disclose a two-unit zoom lens which consists of a first lens unit having a positive refractive power and a second lens unit having a negative refractive power, and performs zooming by moving both of the lens units forward while changing the distance between the lens units.

Still furthermore, Japanese Patent Laid-Open Nos. 2-50118, 2-71220, 2-190812, 4-145408 and the like disclose a two-unit zoom lens having a relatively high zooming ratio, which consists of a first lens unit having a positive refractive power and a second lens unit having a negative refractive power, and performs zooming by changing the distance between the lens units.

In the above-mentioned two-unit zoom lenses consisting of a first unit having a positive refractive power and a second lens unit having a negative refractive power, it is necessary to appropriately set the layouts of lenses in the lens units in order to achieve good correction of distortion on the wide-angle side, to downsize the total lens system while ensuring a predetermined amount of light on the periphery of the image plane, to obtain a wide field angle of about 74° at the wide-angle end and a zooming ratio of about 2.7, and to maintain high optical performance over the entire zoom range.

Generally, the zooming ratio of such a two-unit zoom lens can be easily increased by increasing the refractive powers of the first and second lens units, which decreases the moving amount of the lens units in zooming, and shortens the total lens length. However, if the refractive powers of the lens units are simply increased, the changes in aberration resulting from zooming are increased, and made difficult to correct.

SUMMARY OF THE INVENTION

Accordingly, it is an object of the present invention to provide a two-unit zoom lens which appropriately sets the layout of lenses in a first lens unit having a positive refractive power and/or a second lens unit having a negative refractive power in order to correct distortion on the wide-angle side, and to correct the changes in aberration resulting from zooming while maintaining a predetermined amount of light on the periphery of the image plane.

It is another object of the present invention to provide a zoom lens which has a wide field angle of about 74° at the wide-angle end, a zooming ratio of about 2.6 to 3 and a short lens length, and which maintains high optical performance over the entire zoom range.

The present invention provides a compact and lightweight zoom lens comprising a first lens unit having a positive refractive power and a second lens unit having a negative refractive power, wherein the zoom lens performs zooming by changing the distance between the first and second lens units, satisfies required conditions related to the glass material, lens shape and optical power of the first and second lens units, and achieves a high zooming ratio ranging from 2.6 to 3 and high optical performance.

The various features which characterize the present invention will become more apparent from the following description taken in connection with the accompanying drawings.

BRIEF DESCRIPTION OF THE DRAWINGS

FIGS. 4A(1)–4A(4), 4B(1)–4B(4), and 4C(1)–4C(4) are aberration curves of the first embodiment.

FIGS. 5A(1)–5A(4), 5B(1)–5B(4), and 5C(1)–5C(4) are aberration curves of the second embodiment.

FIGS. 6A(1)–6A(4), 6B(1)–6B(4), and 6C(1)–6C(4) are aberration curves of the third embodiment.

FIGS. 11A(1)–11A(4), 11B(1)–11B(4), and 11C(1)–11C(4) are aberration curves of the fourth embodiment.

FIGS. 12A(1)–12A(4), 12B(1)–12B(4), and 12C(1)–12C(4) are aberration curves of the fifth embodiment.

FIGS. 13A(1)–13A(4), 13B(1)–13B(4), and 13C(1)–13C(4) are aberration curves of the sixth embodiment.

FIGS. 14A(1)–14A(4), 14B(1)–14B(4), and 14C(1)–14C(4) are aberration curves of the seventh embodiment.

DESCRIPTION OF THE PREFERRED EMBODIMENT

Figure 1A:
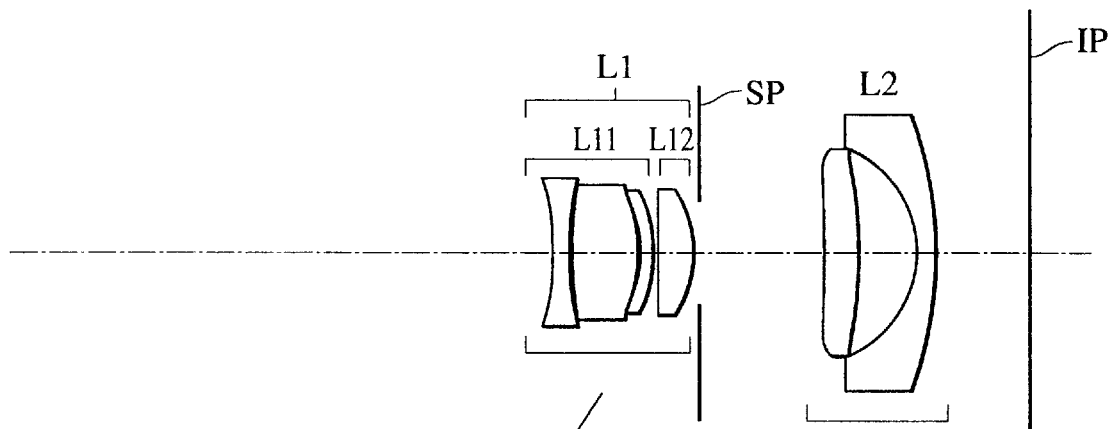
FIGS. 1A, 1B, and 1C are cross-sectional views of a zoom lens according to a first embodiment of the present invention.

FIGS. 1A–1C to 3A–3C are cross-sectional views of zoom lenses according to first, second and third embodiments of the present invention. In these cross-sectional views, A shows a wide-angle zoom position, B shows a middle zoom position, and C shows a telephoto zoom position.

In the figures, L1 denotes a first lens unit having a positive refractive power and L2 denotes a second lens unit having a negative refractive power. By moving both the lens units toward an object as shown by the arrows while decreasing the distance between the lens units, zooming from the wide-angle end to the telephoto end is performed. SP represents a stop which moves integrally with the first lens unit L1 in the present invention.

The first lens unit L1 consists of two lens subunits, a front lens subunit L11 having a positive or negative refractive power and a rear lens subunit L12 having a positive refractive power, which are divided by the widest air space.

In the zoom lens of this embodiment having the above basic structure, the second lens unit L2 includes a first positive lens and a second negative lens, and the object-side surface of the first lens is aspherical. When the refractive index and Abbe's number of the material of the first lens are represented by Pn and Pv, respectively, the following conditions are satisfied:

$$1.65 < Pn \quad (1)$$

$$38 < Pv \quad (2)$$

In order to excellently correct the changes in aberrations, such as coma and distortion, resulting from zooming, the first lens unit L1 includes the front lens subunit L11 and the rear lens subunit L12 having a positive refractive power which are divided by the widest air space. The front lens unit L11 consists of a first negative lens with an aspherical plane on the image side, a second positive lens with a convex plane on the image side, and a third negative meniscus lens with a concave plane on the object side. When the radius of curvature of the image-side plane of the second lens in the front lens subunit L11 is R4, the radius of curvature of the object-side plane of the third lens in the front lens subunit L11 is R5 and the imaging magnifications of the second lens unit L2 at the wide-angle end and at the telephoto end are β2w and β2T, respectively, the following conditional expressions (3) and (4) are satisfied:

$$1 \leq R4/R5 < 1.5 \quad (3)$$

$$2.2 < \beta 2T/\beta 2w < 3.5 \quad (4)$$

In order to shorten the total lens length and excellently correct aberration changes in zooming, the following conditions are satisfied:

$$0.23 < f2/fT < 0.3 \quad (5)$$

$$0.55 < fw/Y < 0.75 \quad (6)$$

where the focal length of the second lens unit L2 is f2, the focal lengths of the whole system at the wide-angle end and at the telephoto end are fw and fT respectively, and the diagonal length of the effective field of view is Y.

On the other hand, in a second embodiment, a first lens unit L1 consists of a front lens subunit L11 and a rear lens sub-unit L12 having a positive refractive power which are divided by the widest air space. The front lens sub-unit L11 consists of a negative first lens with an aspherical surface on the image plane side, a positive second lens with a convex surface on the image plane side, and a negative third meniscus lens with a concave surface on the object side, and the rear lens subunit L12 consists of a first positive lens. When the radius of curvature of the image-side plane of the second lens in the front lens subunit L11 is R4, the radius of curvature of the object-side plane of the third lens in the front lens subunit L11 is R5, and the imaging magnifications of the second lens unit L2 at the wide-angle end and at the telephoto end are β2w and β2T, respectively, the above conditional expressions (3) and (4) are satisfied.

In order to shorten the total lens length and excellently correct aberration changes in zooming, the following conditions are satisfied:

$$0.23 < f2/fT < 0.3 \quad (5)$$

$$0.55 < fw/Y < 0.75 \quad (6)$$

where the focal length of the second lens unit L2 is f2, the focal lengths of the whole system at the wide-angle end and at the telephoto end are fw and fT respectively, and the diagonal length of the effective field of view is Y.

Next, technical meanings of the above conditional expressions (1) to (6) will be described collectively.

The conditional expressions (1) and (2) are used to appropriately set the refractive index and Abbe's number of the material of the first positive lens in the second lens unit, and to excellently correct chromatic aberration of magnification on the wide-angle side and coma mainly on the periphery of the image plane. If the refractive index deviates from the values limited by the conditional expression (1), it is difficult to correct coma on the periphery of the image plane on the wide-angle side. If the Abbe's number deviates from the values limited by the conditional expression (2) and the dispersive power of the material of the first positive lens increases, it is difficult to correct chromatic aberration of magnification on the wide-angle side.

The conditional expression (3) is used to appropriately set the ratio between the radii R4 and R5 of curvature of the image-side plane of the second lens and the object-side plane of the third lens in the front lens subunit, and to correct coma and distortion mainly on the wide-angle side. If the ratio is more than the upper-limit value in the conditional expression (3) and the radius of curvature R5 is too large compared with the radius of curvature R4, correction of coma on the wide-angle side is difficult. If the ratio is less than the lower-limit value and the radius of curvature R5 is too small compared with the radius of curvature R4, barrel distortion is caused on the wide-angle side, which makes it difficult to maintain a predetermined amount of light on the periphery of the image plane.

The conditional expression (4) is used to appropriately set the ratio between imaging magnifications of the second lens unit at the wide-angle end and at the telephoto end, and mainly to excellently correct aberrations while maintaining a predetermined zooming ratio. If the ratio is more than the upper-limit value in the conditional expression (4) and the imaging magnification at the telephoto end is too high compared with the imaging magnification at the wide-angle end, changes in aberrations resulting from zooming are increased, and are made difficult to correct. If the ratio is less than the lower-limit value and the imaging magnification at the telephoto end is too low compared with the imaging magnification at the wide-angle end, a predetermined zooming ratio is difficult to ensure.

The conditional expression (5) is related to the ratio between the focal length of the second lens unit and the focal length of the total system at the telephoto end, and is used to obtain a predetermined back focus with the intent to mainly shorten the diameter of the rear lens (second lens unit). If the ratio exceeds the upper-limit value in the conditional expression (5) and the refractive power of the second lens unit decreases, a predetermined back focus is difficult to obtain at the wide-angle end and the diameter of the rear lens increases, which results are not preferable. If the ratio falls below the lower-limit value and the refractive power of the second lens unit becomes too high, changes in aberration resulting from zooming increase, and these changes are difficult to correct.

The conditional expression (6) is used to appropriately set the ratio between the focal length at the wide-angle end and the diagonal length of the effective field of view, and to facilitate correction of aberrations on the wide-angle side with intent to mainly shorten the total lens length. If the ratio exceeds the upper-limit value of the conditional expression (6) and the diagonal length decreases, the total lens length at the wide-angle end increases. If the ratio is less than the lower-limit value, correction of aberrations on the wide-angle side is difficult.

Furthermore, in order to maintain high optical performance over the entire image plane in zooming, it is preferable to limit the values in the conditional expressions as follows:

$$1.66 < Pn \tag{1a}$$

$$40 < Pv \tag{2a}$$

$$1 \leq R4/R5 < 1.3 \tag{3a}$$

$$2.5 < \beta 2T/\beta 2w < 3.0 \tag{4a}$$

$$0.25 < f2/fT < 0.29 \tag{5a}$$

$$0.6 < fw/Y < 0.7 \tag{6a}$$

Figure 1B:
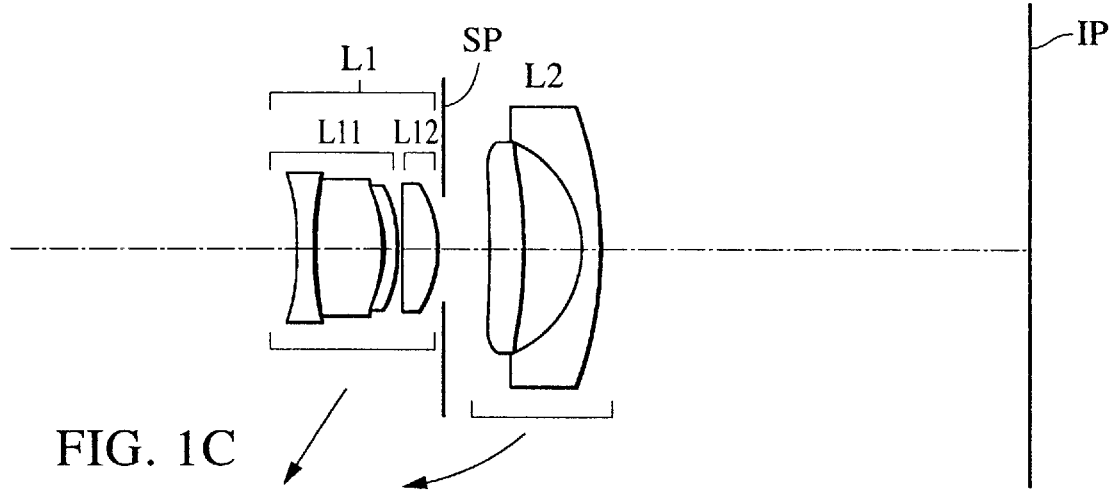
Figure 1C:
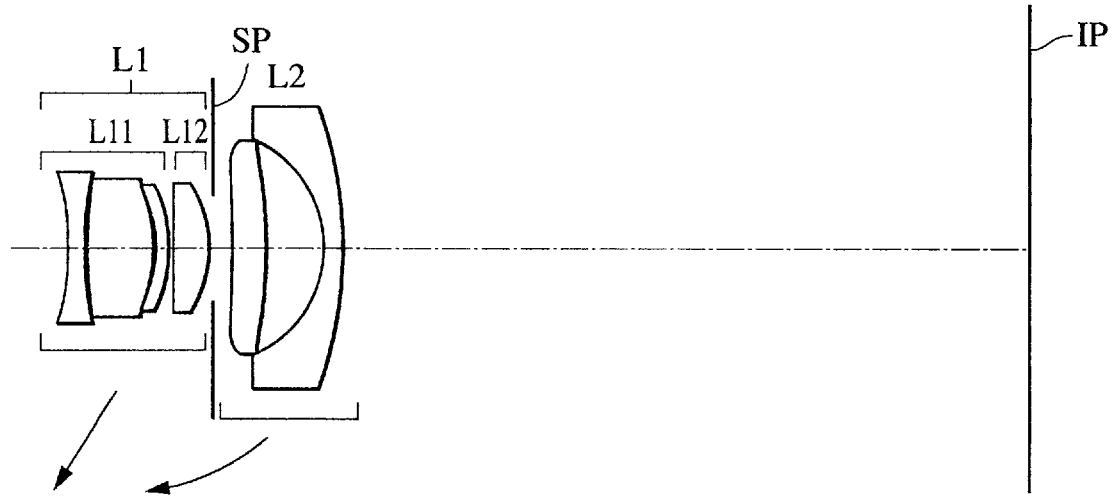
Figure 2A:
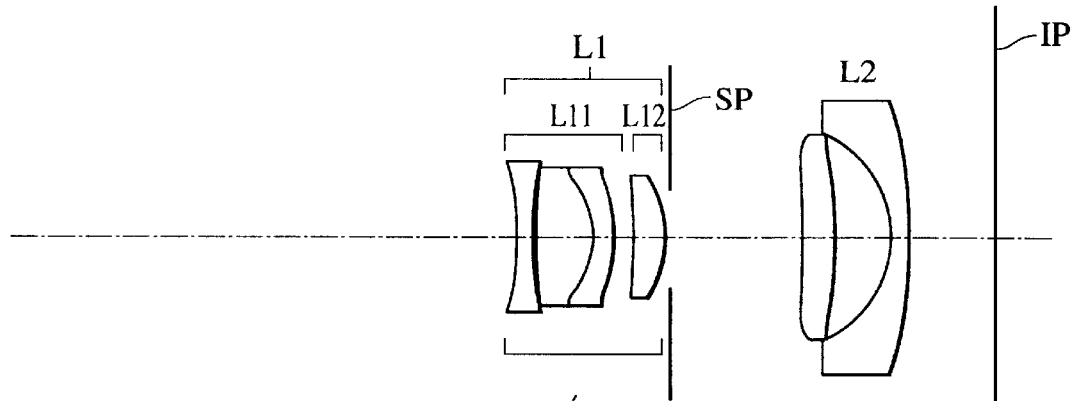
FIGS. 2A, 2B, and 2C are cross-sectional views of a zoom lens according to a second embodiment of the present invention.
Figure 2B:
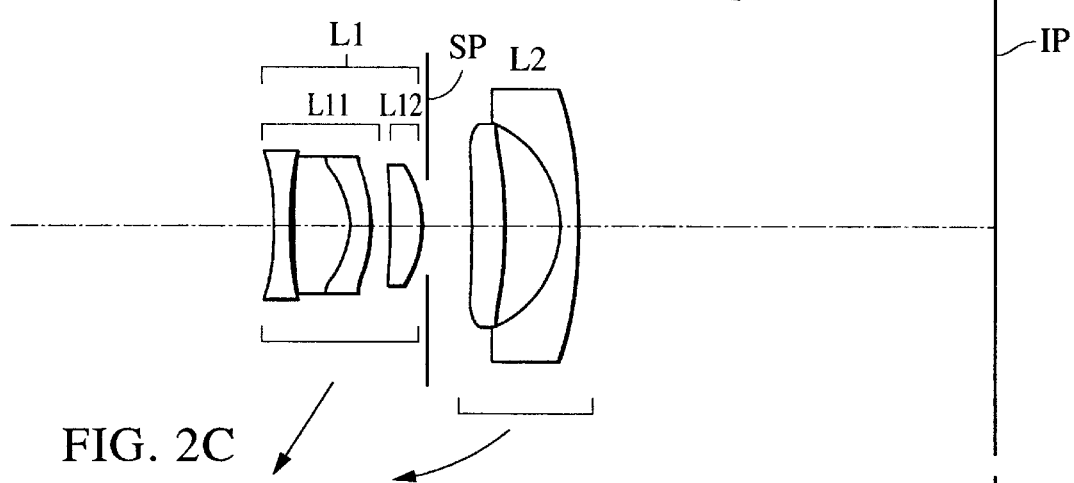
Figure 2C:
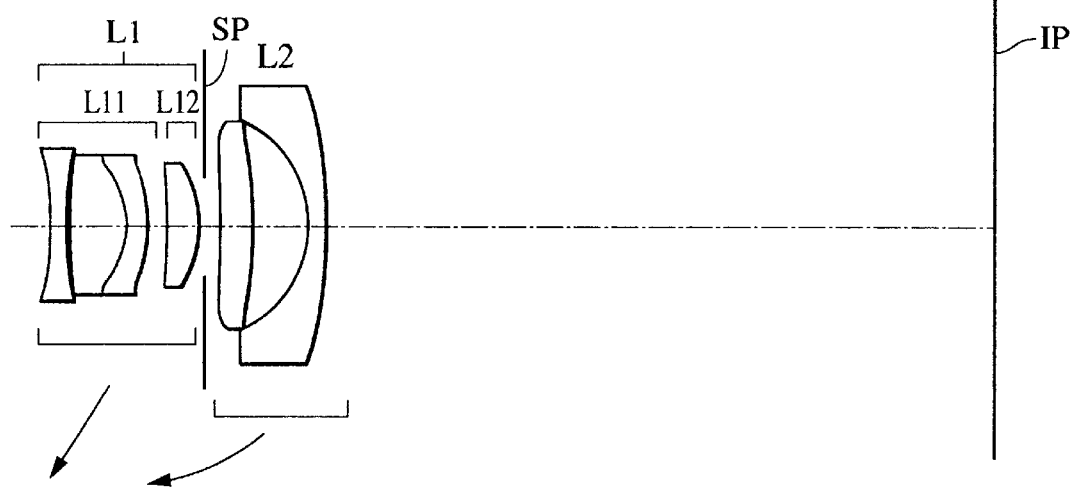
Figure 3A:
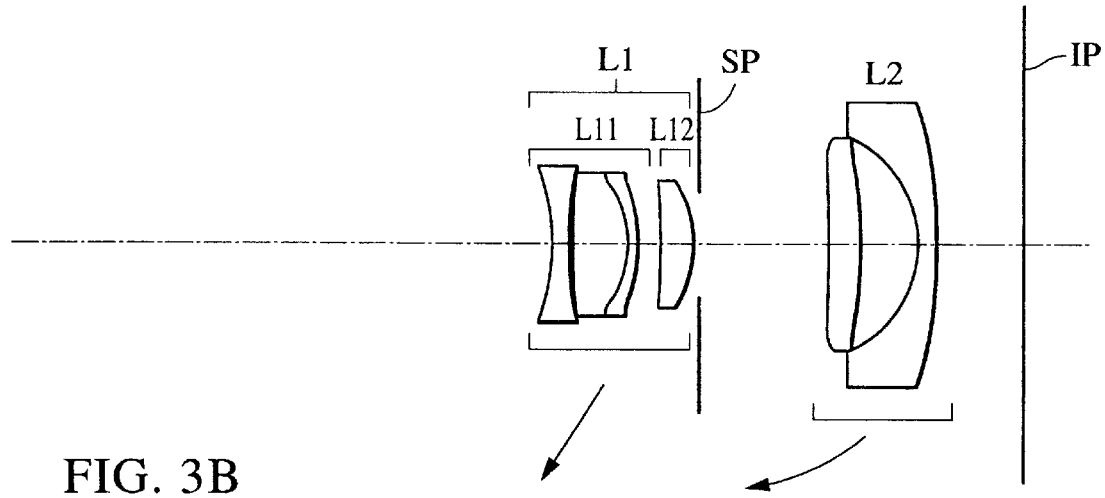
FIGS. 3A, 3B, and 3C are cross-sectional views of a zoom lens according to a third embodiment of the present invention.
Figure 3B:
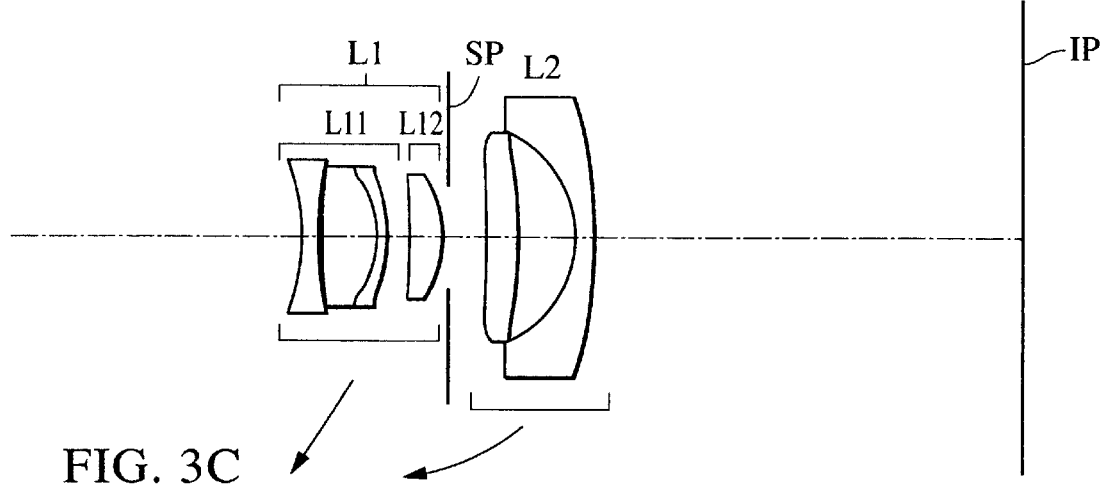
Figure 3C:
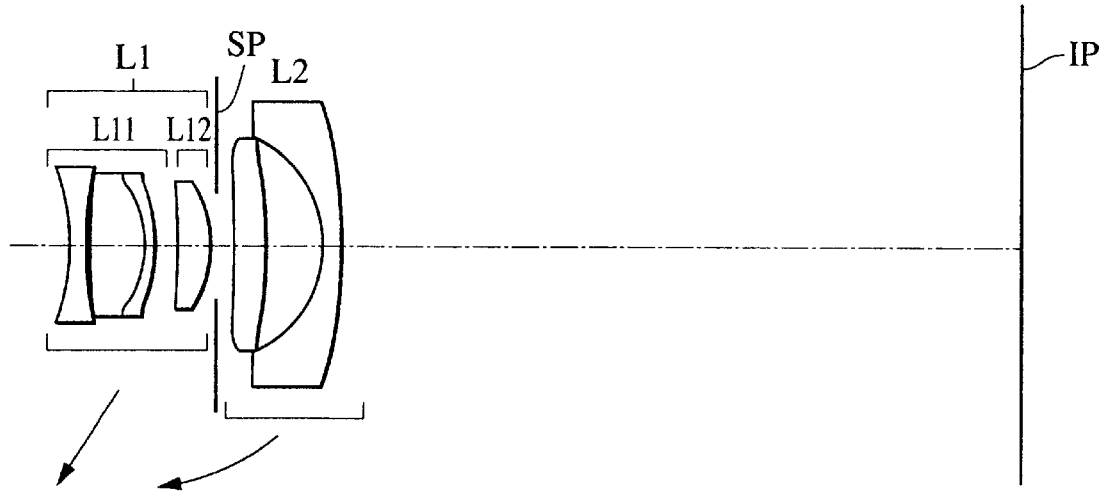

In the first embodiment shown in FIGS. 1A–1C, the first lens unit consists of four lenses in four units including a negative lens having concave surfaces on both sides, a positive lens having convex surfaces on both sides, a negative meniscus lens having a concave surface on the object side, and a positive lens.

In the second and third embodiments shown in FIGS. 2A–2C 3A–3C, the first lens unit consists of four lenses in three units including a negative lens having concave planes on both sides, a laminated lens formed by joining a positive lens having convex surfaces on both sides and a negative meniscus lens having a concave surface on the object side, and a positive lens. In the first to third embodiments shown in FIGS. 1A–1C to 3A–3C, the second lens unit consists of a positive aspherical lens and a negative meniscus lens having a convex plane on the image plane side.

Next, numerical examples corresponding to the above-mentioned embodiments will be described. In the numerical examples, Ri represents the radius of curvature of the i-th lens plane from the object side, Di represents the thickness and air space of the i-th lens from the object side, Ni and v respectively represent the glass refractive index and Abbe's number of the i-th lens from the object side.

The relationship between the above-mentioned conditional expressions and numerical values in the numerical examples is shown in Table 1.

The aspherical shape is expressed in the coordinates in which the X axis represents the direction of the optical axis, the H axis represents the direction vertical to the optical axis and the travel direction of light is taken as a positive direction, and the coordinates are given by the following equation:

$$X = \frac{(1/R)H^2}{1 + \sqrt{1 - (H/R)^2}} + AH^2 + BH^4 + CH^6 + DH^8 + EH^{10}$$

where R is the paraxial radius of curvature, and A, B, C, D and E are respectively aspherical coefficients. Furthermore, "e-0X" represents "$10^{-x}$".

NUMERICAL EXAMPLE 1 f = 28.95 to 78.00    $F_{NO}$ = 3.62 to 9.75    $2\omega$ = 73.5° to 31.0°

| | | |
|---|---|---|
| R1 = −23.54 | D1 = 1.50 | N1 = 1.72874   v1 = 49.2 |
| *R2 = 145.49 | D2 = 0.28 | |
| R3 = 65.99 | D3 = 5.48 | N2 = 1.51633   v2 = 64.2 |
| R4 = −13.37 | D4 = 0.24 | |
| R5 = −11.02 | D5 = 1.00 | N3 = 1.84665   v3 = 23.8 |
| R6 = −13.51 | D6 = 0.54 | |
| R7 = −109.76 | D7 = 2.80 | N4 = 1.48749   v4 = 70.2 |
| R8 = −11.25 | D8 = 0.50 | |
| R9 = Stop | D9 = Variable | |
| *R10 = −75.20 | D10 = 2.80 | N5 = 1.73077   v5 = 40.6 |
| *R11 = −41.06 | D11 = 4.92 | |
| R12 = −10.17 | D12 = 1.50 | N6 = 1.77249   v6 = 49.6 |
| R13 = −41.89 | | |

| | Focal Length | | |
|---|---|---|---|
| Variable Distance | 28.95 | 56.91 | 78.00 |
| D 9 | 11.12 | 3.56 | 1.45 |

Aspherical Coefficients

| | |
|---|---|
| Second plane: | k = 3.940e − 01   A = 0   B = 1.876e − 04 |
| | C = 1.895e − 06   D = −6.440e − 09   E = 6.828e − 10 |
| Tenth plane: | k = 6.695e + 01   A = 0   B = 8.199e − 05 |
| | C = 1.020e − 06   D = −1.057e − 08   E = 1.944e − 10 |
| Eleventh plane: | k = 0   A = 0   B = 6.831e − 06   C = 6.229e − 07 |
| | D = −1.408e − 08   E = 1.871e − 10 |

NUMERICAL EXAMPLE 2 f = 28.95 to 78.00    $F_{NO}$ = 3.62 to 9.75    $2\omega$ = 73.5° to 31.0°

| | | |
|---|---|---|
| R1 = −26.00 | D1 = 1.50 | N1 = 1.72874   v1 = 49.2 |
| *R2 = 251.52 | D2 = 0.37 | |
| R3 = 173.85 | D3 = 4.80 | N2 = 1.57500   v2 = 41.5 |
| R4 = −8.80 | D4 = 1.84 | N3 = 1.84665   v3 = 23.8 |
| R5 = −14.27 | D5 = 1.62 | |
| R6 = −71.33 | D6 = 2.78 | N4 = 1.48749   v4 = 70.2 |
| R7 = −12.13 | D7 = 0.50 | |
| R8 = Stop | D8 = Variable | |
| *R9 = −67.96 | D9 = 3.13 | N5 = 1.72874   v5 = 49.2 |
| *R10 = −32.96 | D10 = 4.61 | |
| R11 = −10.41 | D11 = 1.50 | N6 = 1.77249   v6 = 49.6 |
| R12 = −55.09 | | |

| | Focal Length | | |
|---|---|---|---|
| Variable Distance | 28.95 | 56.91 | 78.00 |
| D 8 | 11.59 | 3.65 | 1.43 |

Aspherical Coefficients

| | |
|---|---|
| Second plane: | k = −4.550e + 03  A = 0  B = 2.023e − 04 |
| | C = 1.695e − 07  D = 3.029e − 08  E = −3.671e − 11 |
| Ninth plane: | k = 5.091e + 01  A = 0  B = 6.747e − 05 |
| | C = 4.808e − 07  D = −1.369e − 09  E = 1.273e − 10 |
| Tenth plane: | k = 0  A = 0  B = −1.104e − 05  C = 2.762e − 07 |
| | D = −1.019e − 08  E = 1.538e − 10 |

NUMERICAL EXAMPLE 3

| f = 28.95 to 78.00 | | $F_{NO}$ = 3.62 to 9.75 | | 2ω = 73.5° to 31.0° |
|---|---|---|---|---|
| R1 = −20.30 | D1 = 1.50 | N1 = 1.78600 | ν1 = 41.0 | |
| *R2 = −1084.93 | D2 = 0.31 | | | |
| R3 = 164.15 | D3 = 4.60 | N2 = 1.57500 | ν2 = 41.5 | |
| R4 = −10.18 | D4 = 0.87 | N3 = 1.84665 | ν3 = 23.8 | |
| R5 = −14.58 | D5 = 1.82 | | | |
| R6 = −145.17 | D6 = 2.78 | N4 = 1.48749 | ν4 = 70.2 | |
| R7 = −11.66 | D7 = 0.70 | | | |
| R8 = Stop | D8 = Variable | | | |
| *R9 = −58.00 | D9 = 2.80 | N5 = 1.66532 | ν5 = 55.4 | |
| *R10 = −35.88 | D10 = 4.82 | | | |
| R11 = −10.01 | D11 = 1.50 | N6 = 1.72915 | ν6 = 54.7 | |
| R12 = −44.34 | | | | |

| | Focal Length | | |
|---|---|---|---|
| Variable Distance | 28.95 | 56.91 | 78.00 |
| D 8 | 10.93 | 3.47 | 1.38 |

Aspherical Coefficients

| | |
|---|---|
| Second plane: | k = −4.550e + 03  A = 0  B = 1.736e − 04 |
| | C = 1.074e − 06  D = 1.431e − 08  E = 1.0321e − 10 |
| Ninth plane: | k = 3.947e + 01  A = 0  B = 9.469e − 05 |
| | C = 9.227e − 07  D = −1.975e − 09  E = 1.524e − 10 |
| Tenth plane: | k = 0  A = 0  B = 1.503e − 06  C = 6.886e − 07 |
| | D = −1.226e − 08  E = 1.938e − 10 |

TABLE 1

| Conditional | Numerical Examples | | |
|---|---|---|---|
| Expressions | 1 | 2 | 3 |
| (1) P n | 1.731 | 1.729 | 1.665 |
| (2) P ν | 40.57 | 49.2 | 55.4 |
| (3) R 4 / R 5 | 1.213 | 1.0 | 1.0 |
| (4) β 2 T / β 2 w | 2.69 | 2.69 | 2.69 |
| (5) f 2 / f T | 0.27 | 0.28 | 0.27 |
| (6) f w / Y | 0.67 | 0.67 | 0.67 |

According to the present invention, as mentioned above, it is possible to achieve a two-unit zoom lens which appropriately sets the layout of lenses in a first lens unit having a positive refractive power and/or a second lens unit having a negative refractive power in order to correct distortion on the wide-angle side, and to correct the changes in aberration resulting from zooming while maintaining a predetermined amount of light on the periphery of the image plane, and which has a wide angle of view of about 74° at the wide-angle end, a zooming ratio of about 2.6 to 3 and a short lens length, and which maintains high optical performance over the entire zoom range.

Next, description will be given to embodiments which obtains a higher zooming ratio by making improvements to the above embodiments.

Figure 7A:
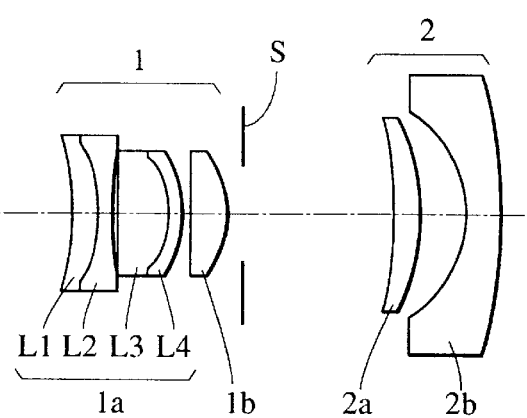
FIGS. 7A, 7B, and 7C are cross-sectional views of a zoom lens according to a fourth embodiment of the present invention.
Figure 7B:
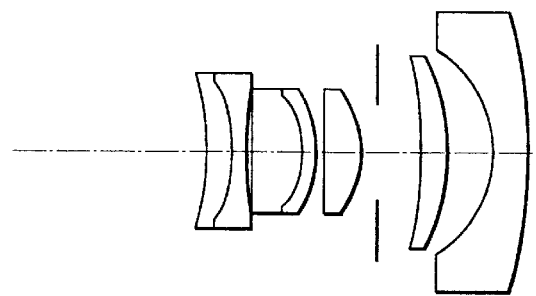
Figure 7C:
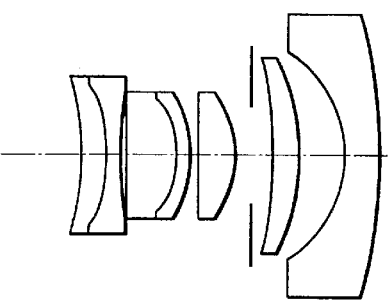

FIGS. 7A–7C are structural views of a zoom lens according to a fourth embodiment of the present invention, and FIGS. 7A, 7B, and 7C show a wide-angle state, a middle state and a telephoto state of the zoom lens, respectively. This zoom lens consists of a first positive lens unit 1, a stop S and a second negative lens unit 2, which are placed in the given order from the object side, and performs zooming by varying the air space between the first and second lens units 1 and 2. The first lens unit 1 consists of a front lens subunit 1a having a small refractive power and a rear lens subunit 1b having a positive refractive power, which are divided by the widest air space. The second lens unit 2 consists of a positive meniscus lens 2a having a convex surface on the image side, and a negative meniscus lens 2b having a convex surface on the image side.

The front lens subunit 1a consists of a first positive meniscus lens L1 having a concave surface on the object side, a second double concave lens L2 whose curvature is sharp on the object side, a third positive lens L3 which has a sharp curvature on the object side and a heavy thickness, and a fourth negative meniscus lens L4 having a convex surface on the image side. The rear lens subunit 1b consists of a positive meniscus lens having a convex surface on the image side. In other words, the first lens unit 1 is composed of five lenses.

The first and second lenses L1 and L2, and the third and fourth lenses L3 and L4 each take the form of a cemented lens. The image-side plane of the second lens L2, which is located closest to the object among the negative lenses in the front lens subunit 1a, or the adjoining lens plane is aspherical, and the second negative lens L2 satisfies the following conditional expressions:

$$1.7 < N1an < 1.9 \tag{7}$$

$$35 < \nu 1an < 45 \tag{8}$$

where N1an and ν1an represent the refractive index and Abbe's number of the second negative lens L2, respectively.

The conditional expression (7) is related to the refractive index of the second negative lens L2. If the refractive index falls below the lower-limit value, the Petzval sum increases in the negative direction, and the field characteristics deteriorate. If the refractive index exceeds the upper-limit value and becomes too high, the cost of a glass material and the manufacturing cost are increased, which is not preferable.

The conditional expression (8) is related to the Abbe's number of the second negative lens L2. If the Abbe's number falls below the lower-limit value and dispersion increases, chromatic aberration of magnification in the wide-angle region increases. If the Abbe's number exceeds the upper-limit value and dispersion decreases, spherical chromatic aberration in the telephoto region increases.

The second lens unit 2 consists of a positive lens 2a and a negative lens 2b. The positive lens 2a has an aspherical plane on at least one side thereof, and satisfies the following conditional expressions:

$$35 < \nu 2p < 50 \tag{9}$$

$$2.5 < \beta 2t/\beta 2w < 3.8 \tag{10}$$

where ν2p represents the Abbe's number of the positive lens 2a, and β2w and β2t respectively represent magnifications of the second lens unit 2 at the wide-angle end and at the telephoto end.

The conditional expression (9) is related to the Abbe's number of the positive lens 2a. If the Abbe's number falls below the lower-limit value and dispersion increases, chromatic aberration of magnification in the wide-angle region is difficult to correct. If the Abbe's number exceeds the upper-limit value and dispersion decreases, axial chromatic aberration resulting from zooming is difficult to correct.

The conditional expression (10) is related to the ratio between the magnifications of the second lens unit 2 at the wide-angle end and at the telephoto end. If the ratio falls below the lower-limit value and the magnification at the telephoto becomes too low, a predetermined zooming ratio cannot be secured. If the ratio exceeds the upper-limit value and the magnification at the telephoto end becomes too high, correction of aberrations resulting from zooming is difficult.

It is more preferable to satisfy not only the above conditional expressions (9) and (10), but also the following conditional expression:

$$1.7 < N2p \tag{11}$$

where N2p represents the refractive index of the positive lens 2a in the second lens unit 2.

The conditional expression (11) is related to the refractive index of the positive lens 2a in the second lens unit 2. If the refractive index falls below the lower-limit value, correction of coma in the wide-angle region is difficult.

Furthermore, the image-side plane of the second lens L2, which is located closest to the object among the negative lenses in the front lens subunit 1a, or the adjoining lens plane is aspherical, and the following condition is satisfied:

$$0.5 < (R1_p + R2_p)/(R1_p - R2_p) < 1.5 \tag{12}$$

where $R1_p$ and $R2_p$ respectively represent the radii of curvature of the object-side and image-side planes of the positive lens adjacent to the image-side plane of the second negative lens L2.

The conditional expression (12) is related to the shape factor of the first lens L1, which is a positive lens adjacent to the second negative lens L2 on the image side, or the third lens L3. If the shape factor is less than the lower-limit value, correction of distortion in the wide-angle region is difficult. If the shape factor is more than the upper-limit value, correction of coma in the wide-angle region is difficult.

Figure 8A:
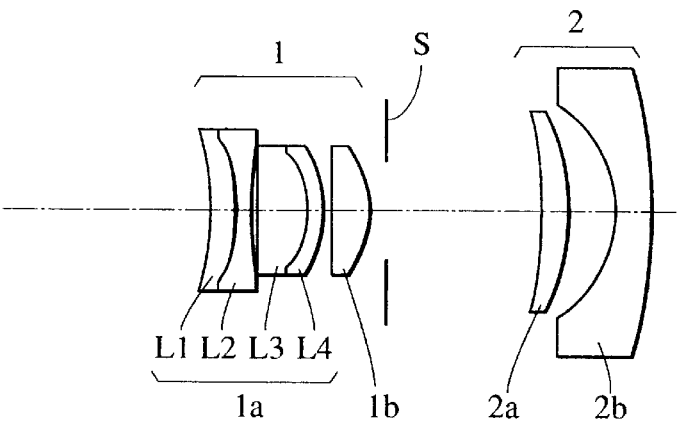
FIGS. 8A, 8B, and 8C are cross-sectional views of a zoom lens according to a fifth embodiment of the present invention.
Figure 8B:
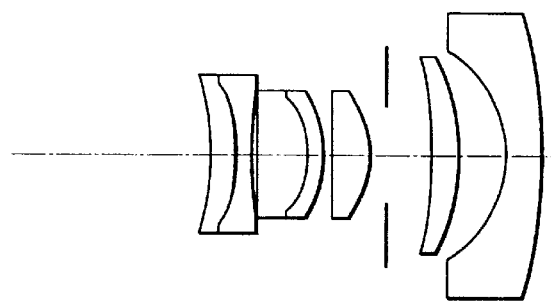
Figure 8C:
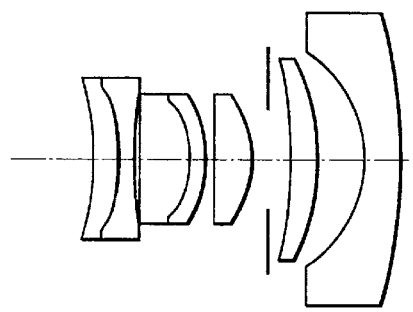

In the fifth embodiment shown in FIGS. 8A–8C, the third lens L3 and the fourth lens L4 constitute a cemented lens.

Figure 9A:
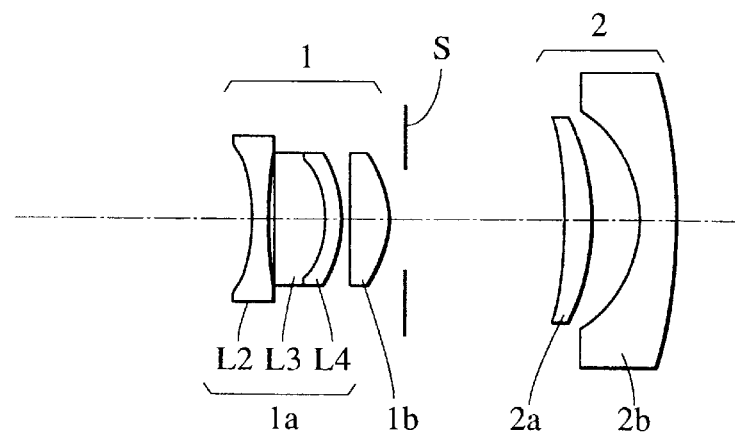
FIGS. 9A, 9B, and 9C are cross-sectional views of a zoom lens according to a sixth embodiment of the present invention.
Figure 9B:
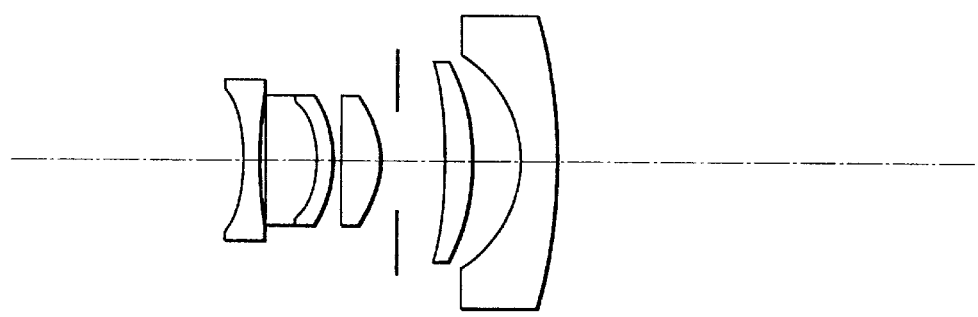
Figure 9C:
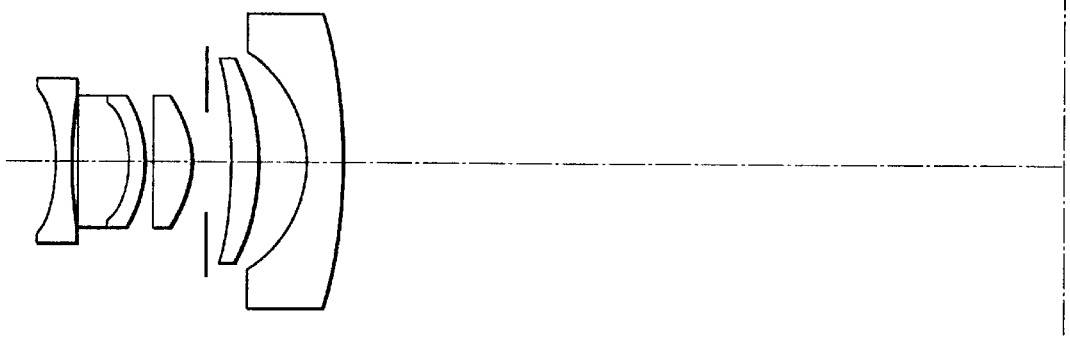

In the sixth embodiment shown in FIGS. 9a–9C, the first lens L1 shown in FIGS. 7A–7C and 8A–8C is omitted. The first lens unit 1 consists of a second lens L2 formed of a double concave lens whose object-side plane has a sharp curvature, a third thick positive lens L3 whose image-side plane has a sharp curvature, a fourth lens L4 which is a negative meniscus lens having a convex plane on the image side, and a rear lens 1b which is a positive meniscus lens having a convex plane on the object side. The third and fourth lenses L3 and L4 constitute a cemented lens.

In the above-mentioned fourth, fifth and sixth embodiments, the image-side plane of the second lens L2, which is located closest to the object among the negative lenses in the first lens unit 1, is aspherical.

Figure 10A:
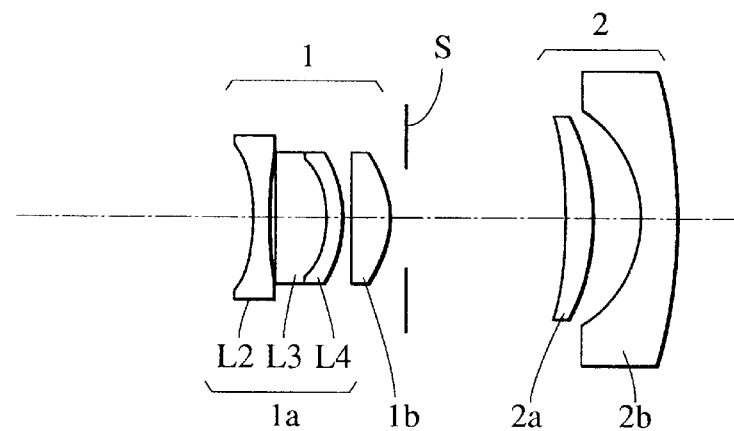
FIGS. 10A, 10B, and 10C are cross-sectional views of a zoom lens according to a seventh embodiment of the present invention.
Figure 10B:
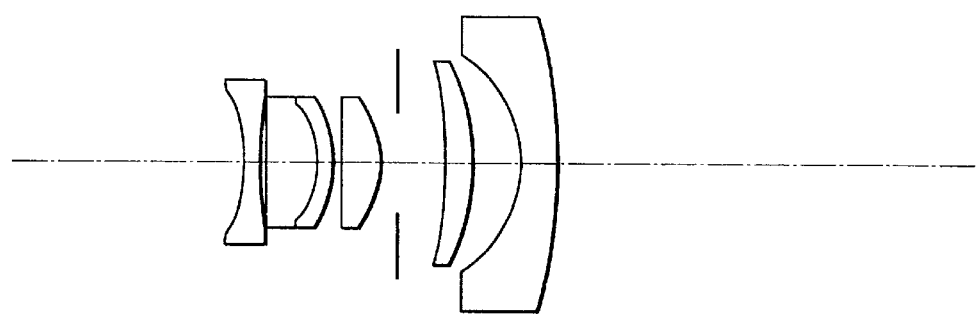
Figure 10C:
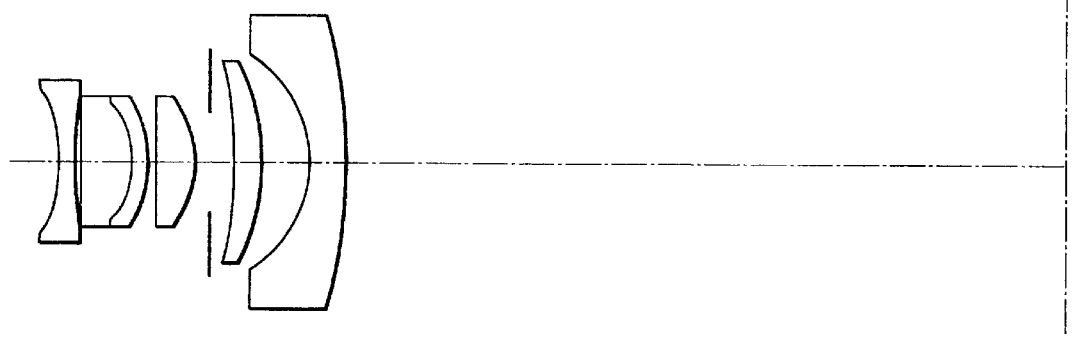

In the seventh embodiment in FIGS. 10A–10C, although the number and layout of lenses are almost similar to those in FIGS. 9A–9C, the object-side plane of the third positive lens L3, which is adjacent to the image side of the second negative lens L2 located closest to the object among the negative lenses in the first lens unit 1, is aspherical.

Furthermore, in the fourth to seventh embodiments, the positive lens 2a located on the object side of the second lens unit 2 has an aspherical surface on the image side thereof.

It is more preferable that numerical values in the conditional expressions (7) to (12) satisfy the following conditions:

$$1.72 < N1an < 1.89 \tag{7}'$$

$$37 < v1an < 43 \tag{8}'$$

$$37 < v2_p < 43 \tag{9}'$$

$$2.7 < \beta 2t/\beta 2w < 3.2 \tag{10}'$$

$$1.71 < N2_p \tag{11}'$$

$$0.75 < (R1_p + R2_p)/(R1_p - R2_p) < 1.2 \tag{12}'$$

Next, numerical examples corresponding to the fourth to seventh embodiments will be shown. Ri, Di, Ni and vi respectively represent the radius of curvature, the axial thickness or distance between the lenses, the refractive index and the Abbe's number of the i-th lens plane from the object side.

NUMERICAL EXAMPLE 4 f = 29.72 to 84.39   $F_{NO}$ = 4.60 to 10.15   2ω = 72.1° to 28.8°

| | | | |
|---|---|---|---|
| R1 = −30.381 | D1 = 2.60 | N1 = 1.672700 | v1 = 32.1 |
| R2 = −14.749 | D2 = 1.25 | N2 = 1.727820 | v2 = 40.6 |
| *R3 = 1049.438 | D3 = 0.39 | | |
| R4 = 1279.888 | D4 = 4.32 | N3 = 1.487490 | v3 = 70.2 |
| R5 = −8.932 | D5 = 1.25 | N4 = 1.806098 | v4 = 41.0 |
| R6 = −13.666 | D6 = 1.11 | | |
| R7 = −58.998 | D7 = 3.09 | N5 = 1.487490 | v5 = 70.2 |
| R8 = −10.931 | D8 = 0.75 | | |
| R9 = Stop | D9 = Variable | | |
| R10 = −47.405 | D10 = 2.58 | N5 = 1.727820 | v6 = 40.6 |
| *R11 = −23.594 | D11 = 4.25 | | |
| R12 = −10.438 | D12 = 2.26 | N7 = 1.772499 | v7 = 49.6 |
| R13 = −91.614 | | | |

| | Focal Length | | |
|---|---|---|---|
| Variable Distance | 29.72 | 59.89 | 84.39 |
| D 9 | 12.43 | 4.42 | 2.13 |

Aspherical Coefficients

Third plane R3:  k = 0  A = 0  B = 1.81991 · $10^{-4}$  C = 1.9565 · $10^{-6}$
  D = −1.21309 · $10^{-8}$  E = 8.98239 · $10^{-10}$
Eleventh plane:  k = 4.65658 · $10^0$  A = 0  B = −1.00680 · $10^{-5}$
R11  C = 1.63963 · $10^{-7}$  D = −6.39846 · $10^{-9}$
  E = 6.61504 · $10^{-11}$

NUMERICAL EXAMPLE 5 f = 29.72 to 84.39   $F_{NO}$ = 4.60 to 10.14   2ω = 72.1° to 28.8°

| | | | |
|---|---|---|---|
| R1 = −39.720 | D1 = 1.74 | N1 = 1.620041 | v1 = 36.3 |
| R2 = −19.387 | D2 = 0.13 | | |
| R3 = −17.750 | D3 = 1.25 | N2 = 1.727820 | v2 = 40.6 |
| *R4 = 587.339 | D4 = 0.45 | | |
| R5 = −334.722 | D5 = 4.51 | N3 = 1.487490 | v3 = 70.2 |
| R6 = −10.527 | D6 = 1.25 | N4 = 1.785896 | v4 = 44.2 |
| R7 = −15.087 | D7 = 1.16 | | |
| R8 = −72.901 | D8 = 2.96 | N5 = 1.487490 | v5 = 70.2 |
| R9 = −11.161 | D9 = 0.75 | | |
| R10 = Stop | D10 = Variable | | |
| R11 = −57.783 | D11 = 3.08 | N6 = 1.727820 | v6 = 40.6 |
| *R12 = −24.019 | D12 = 4.05 | | |
| R13 = −10.743 | D13 = 2.13 | N7 = 1.804000 | v7 = 49.6 |
| R14 = −100.693 | | | |

-continued f = 29.72 to 84.39    $F_{NO}$ = 4.60 to 10.14    $2\omega$ = 72.1° to 28.8°

| | Focal Length | | |
|---|---|---|---|
| Variable Distance | 29.72 | 60.04 | 84.39 |
| D10 | 12.68 | 4.23 | 1.84 |

Aspherical Coefficients

| Fourth plane: R4 | k = -3.97102 · 10$^1$  A = 0  B = 1.83193 · 10$^{-4}$<br>C = 1.77523 · 10$^{-6}$  D = -7.15102 · 10$^{-9}$<br>E = 7.62065 · 10$^{-10}$ |
|---|---|
| Twelfth plane: R12 | k = 4.32094 · 10$^0$  A = 0  B = -1.39729 · 10$^{-5}$<br>C = 4.95615 · 10$^{-8}$  D = -3.51679 · 10$^{-9}$<br>E = 3.00982 · 10$^{-11}$ |

NUMERICAL EXAMPLE 6 f = 29.72 to 84.40    $F_{NO}$ = 4.60 to 10.14    $2\omega$ = 72.1° to 28.8°

| R1 = -36.644 | D1 = 1.88 | N1 = 1.727820 | ν1 = 40.6 |
|---|---|---|---|
| *R2 = 626.012 | D2 = 0.54 | | |
| R3 = -168.909 | D3 = 4.81 | N2 = 1.487490 | ν2 = 70.2 |
| R4 = -12.198 | D4 = 1.50 | N3 = 1.882997 | ν3 = 40.8 |
| R5 = -16.591 | D5 = 0.95 | | |
| R6 = -80.783 | D6 = 3.09 | N4 = 1.487490 | ν4 = 70.2 |
| R7 = -11.280 | D7 = 0.75 | | |
| R8 = Stop | D8 = Variable | | |
| R9 = -53.451 | D9 = 2.99 | N5 = 1.727820 | ν5 = 40.6 |
| *R10 = -22.639 | D10 = 3.74 | | |
| R11 = -10.531 | D11 = 2.13 | N6 = 1.804000 | ν6 = 46.6 |
| R12 = -90.846 | | | |

| | Focal Length | | |
|---|---|---|---|
| Variable Distance | 29.72 | 60.05 | 84.40 |
| D 8 | 12.98 | 4.49 | 2.09 |

Aspherical Coefficients

| Second plane: R2 | k = 0  A = 0  B = 1.81840 · 10$^{-4}$  C = 1.86655 · 10$^{-6}$<br>D = -1.22958 · 10$^{-8}$  E = 1.03601 · 10$^{-9}$ |
|---|---|
| Tenth plane: R10 | k = 4.39926 · 10$^0$  A = 0  B = -8.67175 · 10$^{-6}$<br>C = 4.07873 · 10$^{-7}$  D = -1.23457 · 10$^{-8}$<br>E = 1.19790 · 10$^{-10}$ |

NUMERICAL EXAMPLE 7 f = 29.72 to 84.39    $F_{NO}$ = 4.60 to 10.13    $2\omega$ = 72.1° to 28.8°

| R1 = -31.131 | D1 = 1.88 | N1 = 1.882997 | ν1 = 40.8 |
|---|---|---|---|
| R2 = 169.917 | D2 = 0.38 | | |
| *R3 = 68.562 | D3 = 6.30 | N2 = 1.583126 | ν2 = 59.4 |
| R4 = -8.581 | D4 = 1.50 | N3 = 1.834807 | ν3 = 42.7 |
| R5 = -13.086 | D5 = 0.82 | | |
| R6 = -26.188 | D6 = 3.09 | N4 = 1.487490 | ν4 = 70.2 |
| R7 = -11.653 | D7 = 0.75 | | |
| R8 = Stop | D8 = Variable | | |
| R9 = -64.313 | D9 = 3.00 | N5 = 1.727820 | ν5 = 40.6 |
| *R10 = -25.223 | D10 = 3.97 | | |
| R11 = -10.932 | D11 = 2.13 | N6 = 1.804000 | ν6 = 46.6 |
| R12 = -119.722 | | | |

-continued f = 29.72 to 84.39    $F_{NO}$ = 4.60 to 10.13    $2\omega$ = 72.1° to 28.8°

| | Focal Length | | |
|---|---|---|---|
| Variable Distance | 29.72 | 60.05 | 84.39 |
| D 8 | 12.94 | 4.53 | 2.15 |

Aspherical Coefficients

| Third plane R3: | k = 0  A = 0  B = -2.27917 · 10$^{-4}$  C = -1.23887 · 10$^{-6}$<br>D = -3.52373 · 10$^{-8}$  E = 2.39110 · 10$^{-10}$ |
|---|---|
| Tenth plane: R10 | k = 5.36300 · 10$^0$  A = 0  B = -1.40034 · 10$^{-5}$<br>C = 2.64322 · 10$^{-7}$  D = -7.84775 · 10$^{-9}$<br>E = 7.53613 · 10$^{-11}$ |

Numerical values in the conditional expressions of the embodiments are shown in Table 2.

TABLE 2

| Conditional | Numerical Examples | | | |
|---|---|---|---|---|
| Expressions | 4 | 5 | 6 | 7 |
| (7) N1an | 1.73 | 1.73 | 1.73 | 1.88 |
| (8) ν1an | 40.6 | 40.6 | 40.6 | 40.8 |
| (9) ν2p | 40.6 | 40.6 | 40.6 | 40.6 |
| (10) β2t/β2w | 2.84 | 2.84 | 2.84 | 2.84 |
| (11) N2p | 1.73 | 1.73 | 1.73 | 1.73 |
| (12)<br>(R1p + R2p) / (R1p - R2p) | 0.99 | 1.06 | 1.16 | 0.78 |

FIGS. 11A(1)–11C(4) to 14A(1)–14C(4) are aberration curves of the fourth to seventh embodiments.

As described above, a zoom lens of the present invention has a first positive lens unit and a second negative lens unit, includes a wide-angle region, has a high zooming ratio of about 3, and achieves good aberration correction.

What is claimed is:

1. A zoom lens comprising:

a first lens unit having a positive refractive power; and a second lens unit having a negative refractive power, wherein said first lens unit and said second lens unit are located in this order from the object side, said second lens unit includes a first positive lens and a second negative lens, and said first lens has an aspherical surface on the object side thereof, and satisfies the following conditions:

1.65<Pn

38<Pv where the refractive index and Abbe's number of the material of said first lens are represented by Pn and Pv, respectively.

2. A zoom lens according to claim 1, wherein said first lens unit includes two lens sub-units divided by the widest air space, said two lens sub-units being a front lens subunit and a rear lens subunit having a positive refractive power, said front lens subunit includes a first negative lens with an aspherical surface on the image side, a second positive lens with a convex surface on the image side and a third negative meniscus lens with a concave surface on the object side, said rear lens subunit consists of a first positive lens, and the following conditions are satisfied:

$1 \leq R4/R5 < 1.5$ $2.2 < \beta 2T/\beta 2w < 3.5$ where the radius of curvature of the image-side surface of said second lens is R4, the radius of curvature of the object-side surface of said third lens is R5, and imaging magnifications of said second lens unit at the wide-angle end and at the telephoto end are $\beta 2w$ and $\beta 2T$, respectively.

3. A zoom lens according to claim 1, wherein zooming is performed by changing a distance between said first lens unit and said second lens unit.

4. A zoom lens according to claim 1, wherein said first lens unit comprises, from the object side, a biconcave negative lens, a biconvex positive lens, a negative meniscus lens having a concave surface on the object side, and a positive lens.

5. A zoom lens according to claim 1, wherein said first lens unit consists, from the object side, of a biconcave negative lens, a biconvex positive lens, a negative meniscus lens having a concave surface on the object side, and a positive lens.

6. A zoom lens according to claim 5, wherein said biconvex positive lens and said negative meniscus lens are joined together to form a laminated lens.

7. A zoom lens comprising:

a first lens unit having a positive refractive power; and a second lens unit having a negative refractive power, wherein said first and second lens units are located in this order from the object side, zooming is performed by changing the distance between said lens units, said first lens unit includes a front lens subunit and a rear lens subunit having a positive refractive power, divided by the widest air space, said front lens subunit includes a first negative lens with an aspherical surface on the image side, a second positive lens with a convex surface on the image side, and a third negative meniscus lens with a concave surface on the object side, and said rear lens subunit consists of a first positive lens, and wherein the following conditions are satisfied:

$1 \leq R4/R5 < 1.5$ $2.2 < \beta 2T/\beta 2w < 3.5$ where the radius of curvature of the image-side surface of said second lens in said first lens subunit is R4, the radius of curvature of the object-side surface of said third lens is R5, and imaging magnifications of said second lens unit at the wide-angle end and at the telephoto end are $\beta 2w$ and $\beta 2T$, respectively.

8. A zoom lens according to claim 7, wherein the following conditions are satisfied:

$0.23 < f2/fT < 0.3$ $0.55 < fw/Y < 0.75$ where the focal length of said second lens unit is f2, the focal lengths of the whole system at the wide-angle end and at the telephoto end are respectively fw and fT, and the diagonal length of the effective field of view is Y.

9. A zoom lens comprising:

a first positive lens unit; and a second negative lens unit, wherein said first and second lens units are located in this order from the object side, zooming is performed by varying air space between said lens units, said first lens unit consists of a front lens subunit having a small refractive power and a rear lens subunit having a positive refractive power, divided by the widest air space, the image-side surface of a negative lens located closest to the object among negative lenses in said front lens subunit, or a lens surface adjacent to the image-side surface of said negative lens is aspherical, and the following conditional expressions relating to said negative lens are satisfied:

$1.7 < N1an < 1.9$ $35 < v1an < 45$ where N1an and v1an respectively represent the refractive index and Abbe's number of said negative lens, and wherein all lenses in said first lens unit other than said negative lens have the strongest convex surface on the image side thereof.

10. A zoom lens comprising:

a first positive lens unit; and a second negative lens unit, wherein said first and second lens units are located in this order from the object side, zooming is performed by varying air space between said lens units, said first lens unit consists of a front lens subunit having a small refractive power and a rear lens subunit having a positive refractive power, divided by the widest air space, the image-side surface of a negative lens located closest to the object among negative lenses in said front lens subunit, or a lens surface adjacent to the image-side surface of said negative lens is aspherical, and the following conditional expressions relating to said negative lens are satisfied:

$1.7 < N1an < 1.9$ $35 < v1an < 45$ where N1an and v1an respectively represent the refractive index and Abbe's number of said negative lens, and wherein lenses next to the image side of said negative lens include a positive lens with a strong convex surface on the image side and a negative meniscus lens with a convex surface on the image side.

11. A zoom lens according to claim 10, wherein said two lenses next to the image side of said negative lens constitute a cemented lens.

12. A zoom lens comprising, a first positive lens unit; and a second negative lens unit, wherein said first and second lens units are located in this order from the object side, zooming is performed by varying air space between said lens units, said second lens unit consists of a positive lens and a negative lens, said positive lens has at least one aspherical surface, and the following conditional expressions are satisfied:

$35 < v2p < 50$ $2.5 < \beta 2t/\beta 2w < 3.8$ where v2p represents the Abbe's number of said positive lens, and $\beta 2w$ and $\beta 2t$ respectively represent magnifications of said second lens unit at the wide-angle end and at the telephoto end, wherein said first lens unit comprises a plurality of lens elements, and a space between said plurality of lens elements is constant, and wherein the only lens units comprised by said zoom lens are said first lens unit and said second lens unit.

13. A zoom lens according to claim 12, further satisfying the following conditional expression:

$$1.7 < N2p$$

where N2p represents the refractive index of said positive lens.

14. A zoom lens according to claim 12, wherein said first lens unit has an aspherical surface.

15. A zoom lens comprising:
   a first positive lens unit; and
   a second negative lens unit,
   wherein said first and second lens units are located in this order from the object side, zooming is performed by varying air space between said first and second lens units, said first lens unit consists of a front lens subunit having a small refractive power and a rear lens subunit having a positive refractive power, one of the image-side surface of a negative lens located closest to the object among negative lenses in said front lens subunit, and a lens surface adjacent to the image-side surface of said negative lens is aspherical, and the following conditional expression is satisfied:

$$0.5 < (R1p+R2p)/(R1p-R2p) < 1.5$$

where R1p and R2p respectively represent the radii of curvature of a positive lens, adjacent to the image side of said negative lens, on the object side and on the image side thereof, and
   wherein all lenses in said first lens unit other than said negative lens have the strongest convex surface on the image side thereof.

16. A zoom lens comprising:
   a first positive lens unit; and
   a second negative lens unit,
   wherein said first and second lens units are located in this order from the object side, zooming is performed by varying air space between said first and second lens units, said first lens unit consists of a front lens subunit having a small refractive power and a rear lens subunit having a positive refractive power, one of the image-side surface of a negative lens located closest to the object among negative lenses in said front lens subunit, and a lens surface adjacent to the image-side surface of said negative lens is aspherical, and the following conditional expression is satisfied:

$$0.5 < (R1p+R2p)/(R1p-R2p) < 1.5$$

where R1p and R2p respectively represent the radii of curvature of a positive lens, adjacent to the image side of said negative lens, on the object side and on the image side thereof, and
   wherein lenses next to the image side of said negative lens include a positive lens with a strong convex surface on the image side and a negative meniscus lens with a convex surface on the image side.

17. A zoom lens according to claim 16, wherein said two lenses next to the image side of said negative lens constitute a cemented lens.

18. A zoom lens comprising:
   a first positive lens unit; and
   a second negative lens unit,
   wherein said first and second lens units are located in this order from the object side, zooming is performed by varying air space between said lens units, said first lens unit consists of a front lens subunit having a small refractive power and a rear lens subunit having a positive refractive power, divided by the widest air space, the image-side surface of a negative lens located closest to the object among negative lenses in said front lens subunit, or a lens surface adjacent to the image-side surface of said negative lens is aspherical, and the following conditional expressions relating to said negative lens are satisfied:

$$1.7 < N1an < 1.9$$
$$35 < v1an < 45$$

where N1an and v1an respectively represent the refractive index and Abbe's number of said negative lens, and
   wherein said front lens subunit comprises, from the object side, a positive meniscus lens having a concave surface on the object side, a double concave lens, a positive lens, and a negative meniscus lens having a convex surface on the image side.

19. A zoom lens comprising:
   a first positive lens unit; and
   a second negative lens unit,
   wherein said first and second lens units are located in this order from the object side, zooming is performed by varying air space between said lens units, said first lens unit consists of a front lens subunit having a small refractive power and a rear lens subunit having a positive refractive power, divided by the widest air space, the image-side surface of a negative lens located closest to the object among negative lenses in said front lens subunit, or a lens surface adjacent to the image-side surface of said negative lens is aspherical, and the following conditional expressions relating to said negative lens are satisfied:

$$1.7 < N1an < 1.9$$
$$35 < v1an < 45$$

where N1an and v1an respectively represent the refractive index and Abbe's number of said negative lens, and
   wherein said front lens subunit consists, from the object side, of a positive meniscus lens having a concave surface on the object side, a double concave lens, a positive lens, and a negative meniscus lens having a convex surface on the image side.

20. A zoom lens according to claim 19, wherein said first and second lenses form a cemented lens, and said third and fourth lenses form a cemented lens.

21. A zoom lens comprising,
   a first positive lens unit; and
   a second negative lens unit,
   wherein said first and second lens units are located in this order from the object side, zooming is performed by varying air space between said lens units, said second lens unit consists of a positive lens and a negative lens, said positive lens has at least one aspherical surface, and the following conditional expressions are satisfied:

$$35 < v2p < 50$$
$$2.5 < \beta 2t/\beta 2w < 3.8$$

where $v2p$ represents the Abbe's number of said positive lens, and $\beta 2w$ and $\beta 2t$ respectively represent magnifications of said second lens unit at the wide-angle end and at the telephoto end, wherein said first lens unit comprises, from the object side, a double concave lens, a positive lens, a negative meniscus lens having a convex surface on the image side, and a positive meniscus lens having a convex surface on the object side.

22. A zoom lens comprising:

a first positive lens unit; and a second negative lens unit, wherein said first and second lens units are located in this order from the object side, zooming is performed by varying air space between said lens units, said second lens unit consists of a positive lens and a negative lens, said positive lens has at least one aspherical surface, and the following conditional expressions are satisfied:

$$35 < \nu 2p < 50$$

$$2.5 < \beta 2t / \beta 2w < 3.8$$

where ν2p represents the Abbe's number of said positive lens, and β2w and β2t respectively represent magnifications of said second lens unit at the wide-angle end and at the telephoto end, wherein said first lens unit consists, from the object side, of a double concave lens, a positive lens, a negative meniscus lens having a convex surface on the image side, and a positive meniscus lens having a convex surface on the object side.

* * * * *

UNITED STATES PATENT AND TRADEMARK OFFICE
CERTIFICATE OF CORRECTION

PATENT NO. : 6,008,953

DATED : December 28, 1999

INVENTOR(S) : Yoshinori ITOH

Page 1 of 2

It is certified that error appears in the above-identified patent and that said Letters Patent is hereby corrected as shown below:

COLUMN 3:
 Line 5, "EMBODIMENT" should read --EMBODIMENTS--.

COLUMN 4:
 Line 1, "sub-unit L12" should read --subunit L12--.
 Line 2, "sub-unit L11" should read --subunit L11--.

COLUMN 5:
 Line 47, "2A-2C 3A-3C," should read --2A-2C and 3A-3C,--.

COLUMN 7:
 Line 64, "obtains" should read --obtain--.

COLUMN 8:
 Line 11, "lens 2 a" should read --lens 2a--.

COLUMN 9:
 Line 7, "telephoto" should read --telephoto end--.
 Line 42, "FIGS. 9a-9C," should read --FIGS. 9A-9C,--.

COLUMN 12:
 Line 59, "sub-units" should read --subunits--.
 Line 60, "sub-units" should read --subunits--.

UNITED STATES PATENT AND TRADEMARK OFFICE
CERTIFICATE OF CORRECTION

PATENT NO. : 6,008,953

DATED : December 28, 1999

INVENTOR(S) : Yoshinori ITOH

It is certified that error appears in the above-identified patent and that said Letters Patent is hereby corrected as shown below:

COLUMN 14:
 Line 45, "comprising," should read --comprising:--.

COLUMN 16:
 Line 51, "comprising," should read --comprising:--.
 Line 64, "µ2p" should read --ν2p--.

Signed and Sealed this

Eighth Day of May, 2001

Attest:

NICHOLAS P. GODICI

Attesting Officer    Acting Director of the United States Patent and Trademark Office